United States Patent
Kinamon et al.

(10) Patent No.: US 11,114,758 B2
(45) Date of Patent: Sep. 7, 2021

(54) METHODS AND SYSTEMS FOR USING A BEAM-FORMING NETWORK IN CONJUNCTION WITH MAXIMAL-RATIO-COMBINING TECHNIQUES

(71) Applicants: Roy Kinamon, Tel Aviv (IL); Moshe Salhov, Herzeliya (IL); Gal Zuckerman, Holon (IL); Oz Liv, Tel Aviv (IL)

(72) Inventors: Roy Kinamon, Tel Aviv (IL); Moshe Salhov, Herzeliya (IL); Gal Zuckerman, Holon (IL); Oz Liv, Tel Aviv (IL)

(73) Assignee: GO NET SYSTEMS LTD, Tel-Aviv (IL)

( * ) Notice: Subject to any disclaimer, the term of this patent is extended or adjusted under 35 U.S.C. 154(b) by 0 days.

(21) Appl. No.: 16/567,219

(22) Filed: Sep. 11, 2019

(65) Prior Publication Data
US 2020/0091606 A1 Mar. 19, 2020

Related U.S. Application Data

(63) Continuation of application No. 15/364,321, filed on Nov. 30, 2016, now abandoned, which is a
(Continued)

(51) Int. Cl.
*H01Q 3/40* (2006.01)
*H04B 7/08* (2006.01)
*H04B 7/06* (2006.01)
*H01Q 25/00* (2006.01)
*H04L 27/26* (2006.01)
(Continued)

(52) U.S. Cl.
CPC ............... *H01Q 3/40* (2013.01); *H01Q 3/24* (2013.01); *H01Q 21/22* (2013.01); *H01Q 21/24* (2013.01); *H01Q 25/008* (2013.01); *H04B 7/0617* (2013.01); *H04B 7/0697* (2013.01); *H04B 7/086* (2013.01); *H04B 7/0814* (2013.01); *H04B 7/0857* (2013.01); *H04L 27/2647* (2013.01); *H04W 28/18* (2013.01); *H04W 72/0453* (2013.01)

(58) Field of Classification Search
CPC ............ H01Q 3/40; H01Q 3/24; H01Q 21/22; H01Q 21/24; H01Q 25/008; H04B 7/0617; H04B 7/0697; H04B 7/0814; H04B 7/0857; H04B 7/086; H04L 27/2647; H04W 28/18; H04W 72/0453
See application file for complete search history.

(56) References Cited

U.S. PATENT DOCUMENTS

| 6,697,643 | B1 * | 2/2004 | Hagerman | ............... H04B 7/10 455/13.3 |
| 6,992,622 | B1 * | 1/2006 | Chiang | ................... H01Q 3/40 342/373 |

(Continued)

*Primary Examiner* — Michael J Moore, Jr.
(74) *Attorney, Agent, or Firm* — Vladimir Sherman; Professional Patent Solutions Ltd

(57) ABSTRACT

Various methods and systems for (i) combining the capabilities of beam-forming networks together with the benefit of using maximal-ratio-combining techniques, and (ii) selecting receiving directions for wireless data packets in conjunction with beam-forming networks.

19 Claims, 32 Drawing Sheets

Related U.S. Application Data continuation of application No. 14/287,248, filed on May 27, 2014, now abandoned, which is a continuation of application No. 13/953,931, filed on Jul. 30, 2013, now abandoned.

(60) Provisional application No. 61/677,089, filed on Jul. 30, 2012, provisional application No. 61/739,094, filed on Dec. 19, 2012.

(51) Int. Cl.
*H04W 28/18* (2009.01)
*H01Q 3/24* (2006.01)
*H01Q 21/22* (2006.01)
*H01Q 21/24* (2006.01)
*H04W 72/04* (2009.01)

(56) References Cited

U.S. PATENT DOCUMENTS

| | | | | |
|---|---|---|---|---|
| 7,817,641 B1* | 10/2010 | Khandani | ............ | H04B 7/0871 370/395.4 |
| 8,451,934 B1* | 5/2013 | Kraft | ............ | H04L 25/14 375/295 |
| 9,608,709 B1* | 3/2017 | Kinamon | ............ | H01Q 3/2682 |
| 2003/0151548 A1* | 8/2003 | Kingsley | ............ | H01Q 3/24 342/368 |
| 2005/0101352 A1* | 5/2005 | Logothetis | ............ | H01Q 25/002 455/562.1 |
| 2005/0113120 A1* | 5/2005 | Rappaport | ............ | H04W 88/12 455/500 |
| 2007/0140177 A1* | 6/2007 | Li | ............ | H04B 7/0695 370/335 |
| 2007/0183523 A1* | 8/2007 | Koo | ............ | H04B 7/0854 375/261 |
| 2008/0012710 A1* | 1/2008 | Sadr | ............ | G06K 7/10356 340/572.1 |
| 2010/0321238 A1* | 12/2010 | Shen | ............ | H01Q 21/061 342/373 |
| 2012/0202431 A1* | 8/2012 | Hawryluck | ............ | H04B 7/024 455/63.4 |
| 2013/0142136 A1* | 6/2013 | Pi | ............ | H04B 7/1555 370/329 |
| 2013/0162476 A1* | 6/2013 | Thomas | ............ | H01Q 3/30 342/372 |
| 2013/0272437 A1* | 10/2013 | Eidson | ............ | H04B 7/0695 375/267 |
| 2013/0343235 A1* | 12/2013 | Khan | ............ | H04B 7/10 370/278 |

* cited by examiner

METHODS AND SYSTEMS FOR USING A BEAM-FORMING NETWORK IN CONJUNCTION WITH MAXIMAL-RATIO-COMBINING TECHNIQUES

CROSS-REFERENCE TO RELATED APPLICATIONS

The present Application is also a continuation application of U.S. patent application Ser. No. 15/364,321, entitled: "METHODS AND SYSTEMS FOR USING A BEAM-FORMING NETWORK IN CONJUNCTION WITH MAXIMAL-RATIO-COMBINING TECHNIQUES", filed by the inventors of the present Application on Nov. 30, 2016.

The present Application is also a continuation application of U.S. patent application Ser. No. 14/287,248, entitled: "METHODS AND SYSTEMS FOR USING A BEAM-FORMING NETWORK IN CONJUNCTION WITH MAXIMAL-RATIO-COMBINING TECHNIQUES", filed by the inventors of the present Application on May 27, 2014.

The present Application is also a continuation application of U.S. patent application Ser. No. 13/953,931, entitled: "METHODS AND SYSTEMS FOR USING A BEAM-FORMING NETWORK IN CONJUNCTION WITH MAXIMAL-RATIO-COMBINING TECHNIQUES", filed by the inventors of the present Application on Jul. 30, 2013.

The present application, U.S. patent application Ser. No. 14/287,248 and U.S. patent application Ser. No. 13/953,931 claim priority from U.S. Provisional Patent Application No. 61/677,089, entitled: "METHODS AND SYSTEMS FOR COMMUNICATING USING A BEAM-FORMING NETWORK", filed by the inventors of the present Application on Jul. 30, 2012, and from U.S. Provisional Patent Application No. 61/739,094, titled: "METHODS AND SYSTEMS FOR USING A PLURALITY OF BEAM-FORMING NETWORKS", filed by the inventors of the present Application on Dec. 19, 2012, both of which are hereby incorporated by reference into the present Application in their entirety.

BACKGROUND

In wireless communication, beam-forming networks may be used to direct/receive wireless signals into/from various selectable directions, thereby achieving substantial array gain. Maximal-Ratio-Combining techniques may be used to enhance signal quality.

SUMMARY

Embodiments of the present invention include methods, circuits, device, systems and assemblies for radio signal beamforming. In one embodiment, a method for receiving multiple signals using maximal-ratio-combining and a beam-forming network comprises: concentrating by a beam-forming network comprising a plurality of beam-ports: (i) a first wireless signal arriving at a plurality of array ports belonging to said beam-forming network, substantially into one of said plurality of beam-ports, and (ii) a second wireless signal arriving at said plurality of array ports, substantially into another of said plurality of beam-ports, said second wireless signal is a multi-path version of said first wireless signal; and combining, by a receiver, said first and second wireless signals, which arrive at said receiver via said one and another of beam-ports respectively, into a third resulting signal, using maximal-ratio-combining, thereby optimizing quality of said third resulting signal.

In one embodiment, a wireless communication system boost reception range of wireless signals using a rotman-lens or butler-matrix as follows: a rotman-lens or butler-matrix comprising a plurality of beam-ports is operative to: (i) focus a first wireless signal arriving at a plurality of array ports belonging to said rotman-lens or butler-matrix, substantially into one of said plurality of beam-ports, said one of beam-ports is determined substantially by an angle of arrival of said first wireless signal into said plurality of array ports, and (ii) focus a second wireless signal that is a multi-path version of said first wireless signal, arriving at said plurality of array ports, substantially into another of said plurality of beam-ports, said another beam-port is determined substantially by an angle of arrival of said second wireless signal into said plurality of array ports; and a receiver, is operative to combine said first and second wireless signals, which arrive at said receiver via said one and another of beam-ports respectively, into a third resulting signal, using maximal-ratio-combining, thereby optimizing quality of said third resulting signal.

In one embodiment, a method for receiving multi-path wireless signals via a beam-forming network comprises: detecting, using a beam-forming network comprising a plurality of beam-ports and belonging to a wireless communication system, a first and a second directions through which a first and a second wireless signals arrive at said wireless communication system respectively, said second wireless signal is a multi-path version of said first wireless signal; connecting, by said wireless communication system, (i) a first of said beam-port, that is associated with said first direction, to a first input of a receiver belonging to said wireless communication system, and (ii) a second of said beam-port, that is associated with said second direction, to a second input of said receiver; and decoding using maximal-ratio-combining, by said receiver, the first and second wireless signals received via said first and second inputs.

In one embodiment, a method for selecting receiving directions for wireless data packets, in which each direction is selected separately and dynamically for each wireless data packet, comprises: detecting, using a beam-forming network comprising a plurality of beam-ports and belonging to a wireless communication system, a direction through which a beginning of a wireless data packet arrives at said wireless communication system; connecting, by said wireless communication system, one of said beam-port that is associated with said direction, to a receiver belonging to said wireless communication system; and receiving, by said receiver, at least a majority of said wireless data packet via said beam-port.

In one embodiment, a method for receiving a wireless communication, comprises: receiving, substantially concurrently, at each of a set of array ports an instance of a data bearing signal; concentrating physically directional components of said instances of data bearing signal onto directional specific beam-ports, such that common directional components received at the set of array ports are directed to a common direction specific beam-port; selecting a subset of the set of directional specific beam-ports for said data bearing signal; and switching the selected subset of direction specific beam-ports to input terminals of a wireless modem.

In one embodiment, a wireless system, comprises: a set of array ports, each adapted to substantially concurrently receive an instance of a data bearing signal; a beamforming network adapted to concentrate physically directional components of said data bearing signal received at the set of array ports onto direction specific beam-ports, such that common direction signal components received at the set of array ports are directed to a common direction specific beam-port; and a switching circuit adapted to select a subset of said directional specific beam-ports and to switch the subset of directional specific beam-ports to input terminals of a wireless modem.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1A:
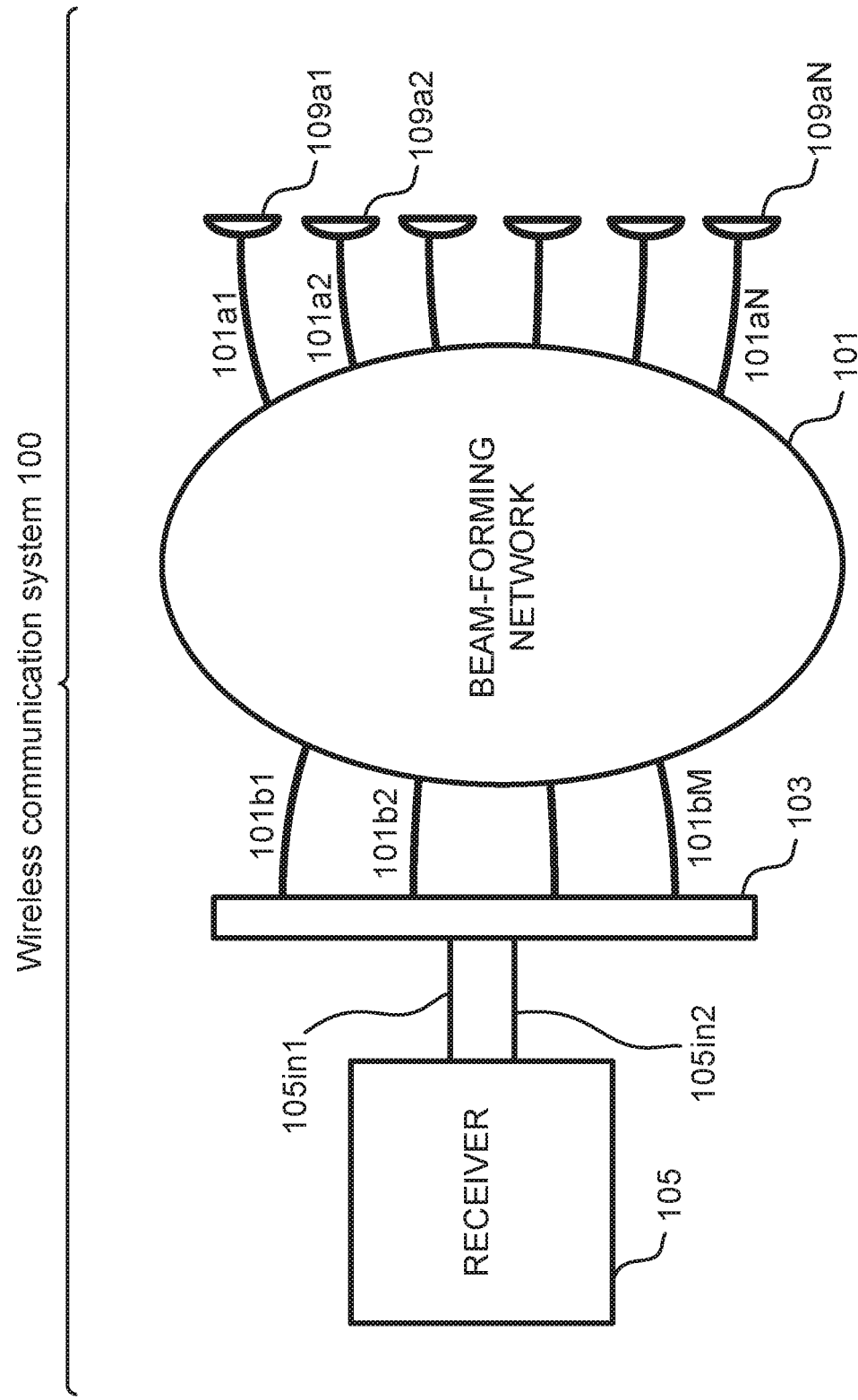
FIG. 1A illustrates one embodiment of a wireless communication system including a receiver and a beam-forming network.
Figure 1B:
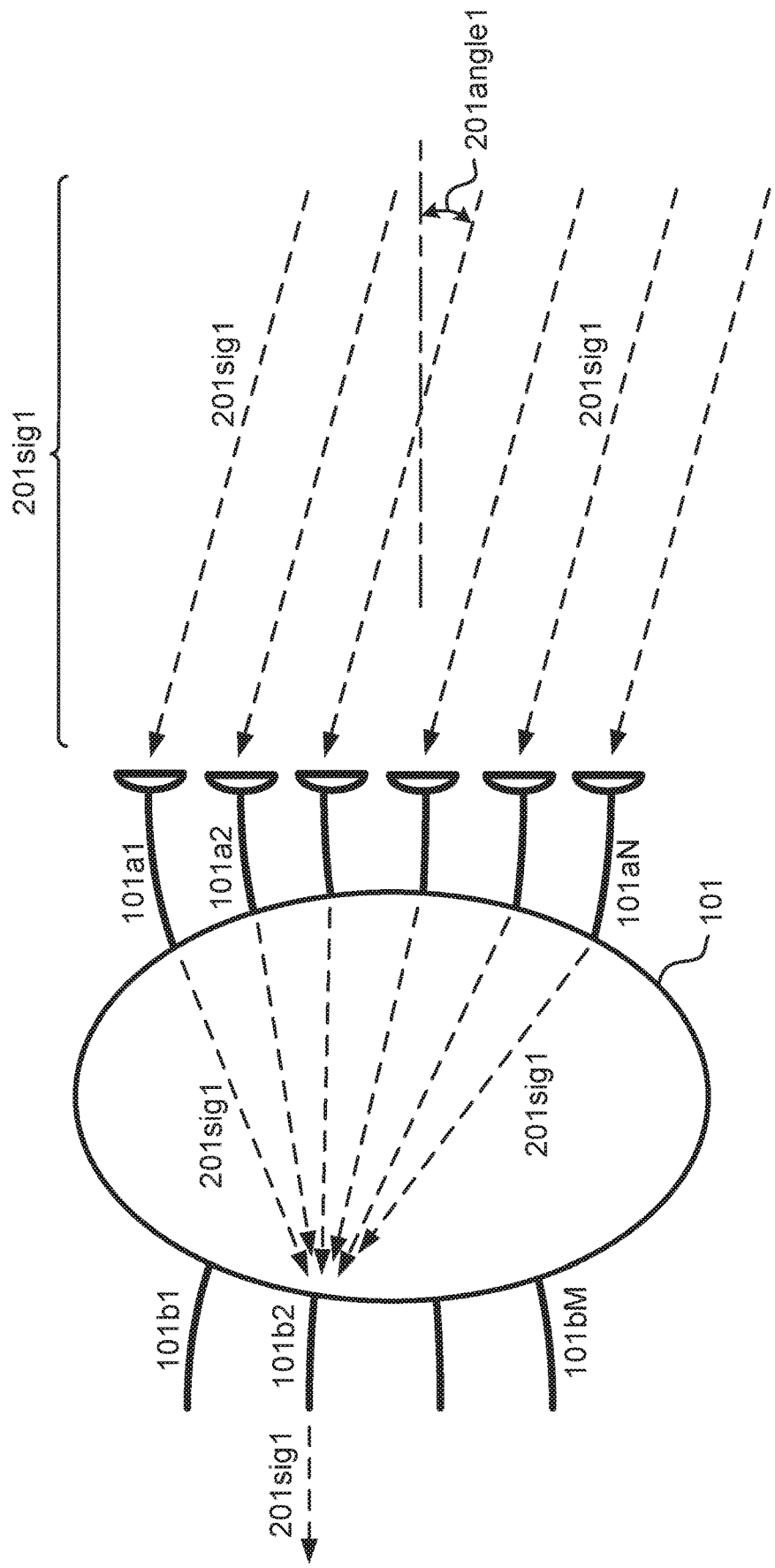
FIG. 1B illustrates one embodiment of a beam-forming network directing a first signal toward one beam-port.
Figure 1C:
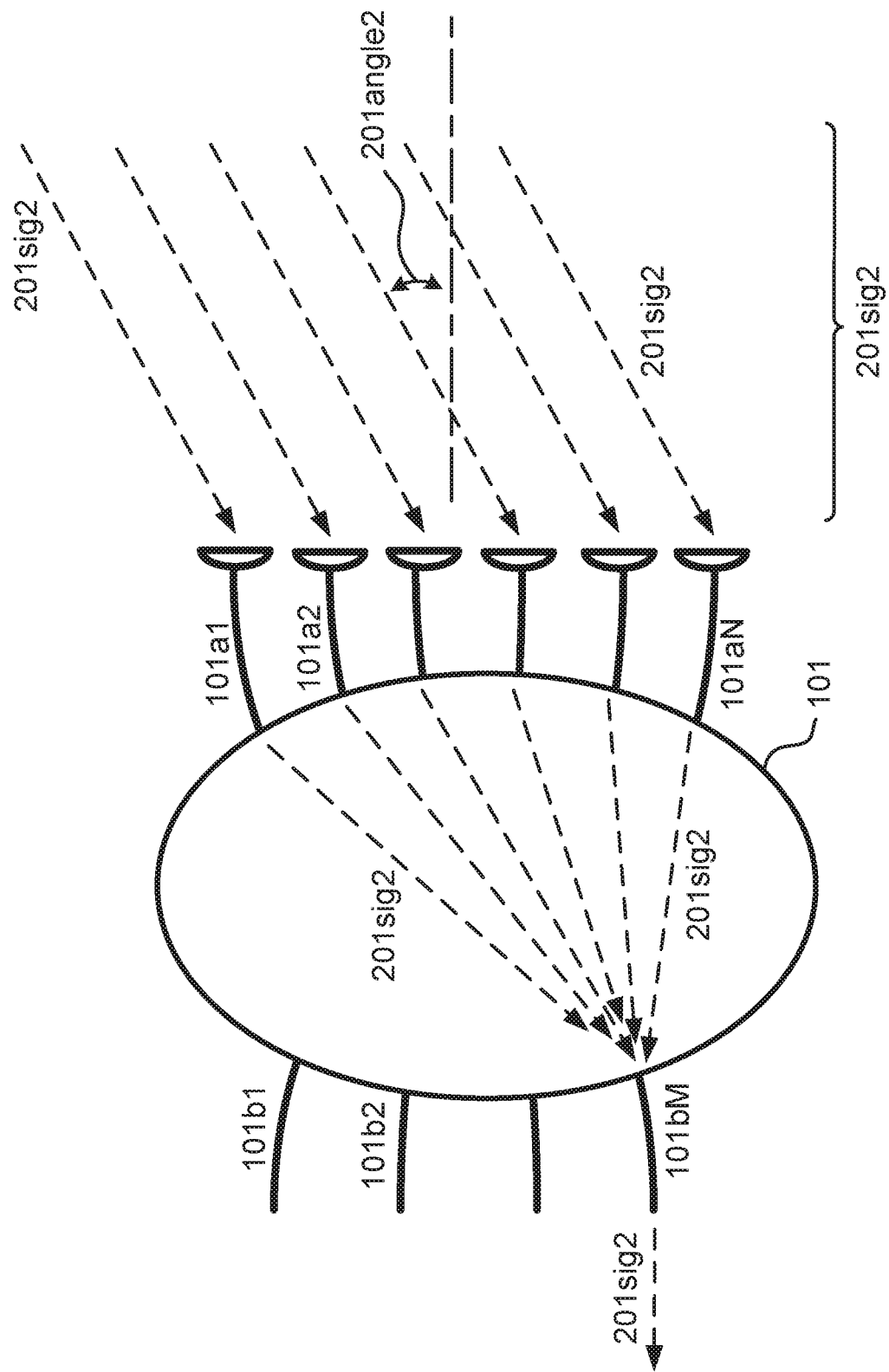
FIG. 1C illustrates one embodiment of a beam-forming network directing a second signal toward another beam-port.
Figure 1D:
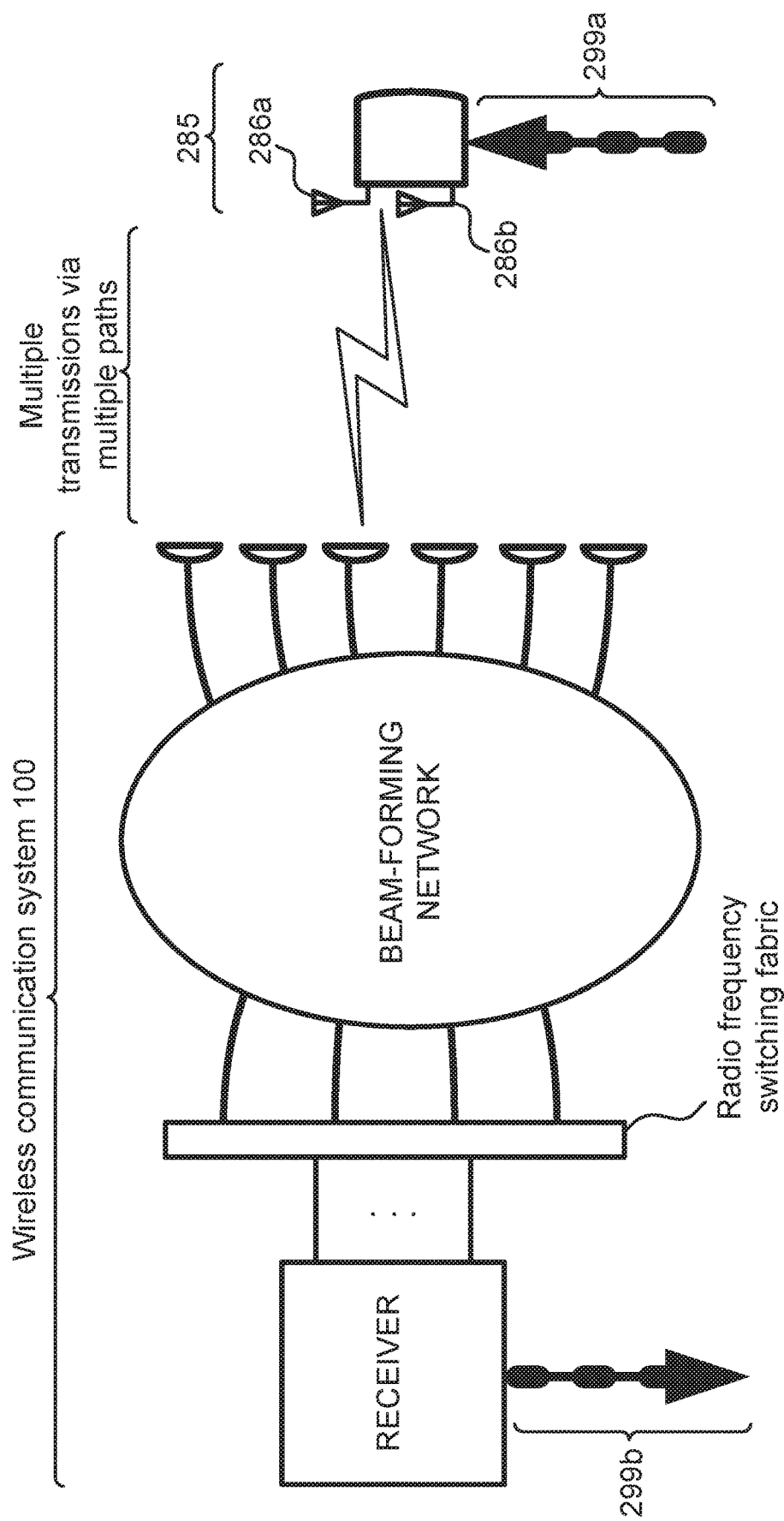
FIG. 1D illustrates one embodiment of a wireless communication system and a remote transceiver.
Figure 1E:
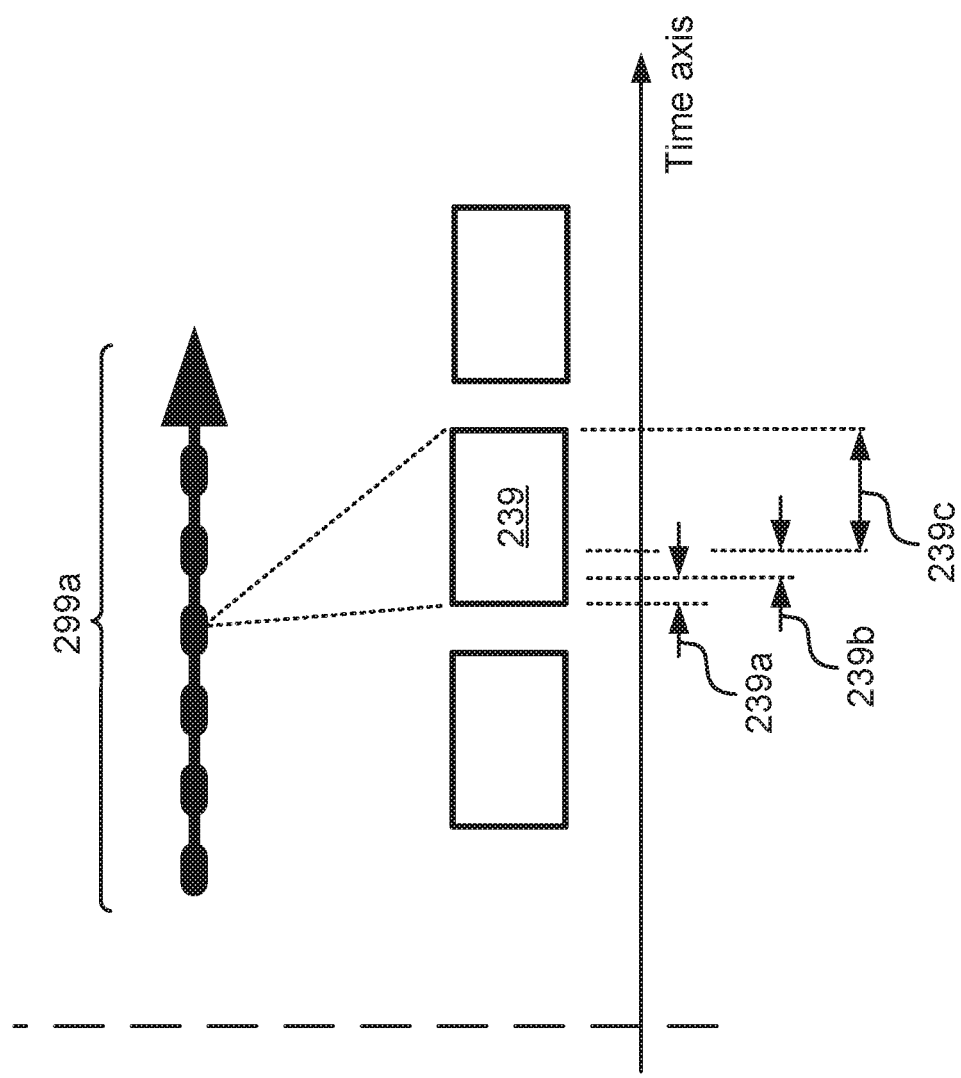
FIG. 1E illustrates one embodiment of a wireless data packet.
Figure 2:
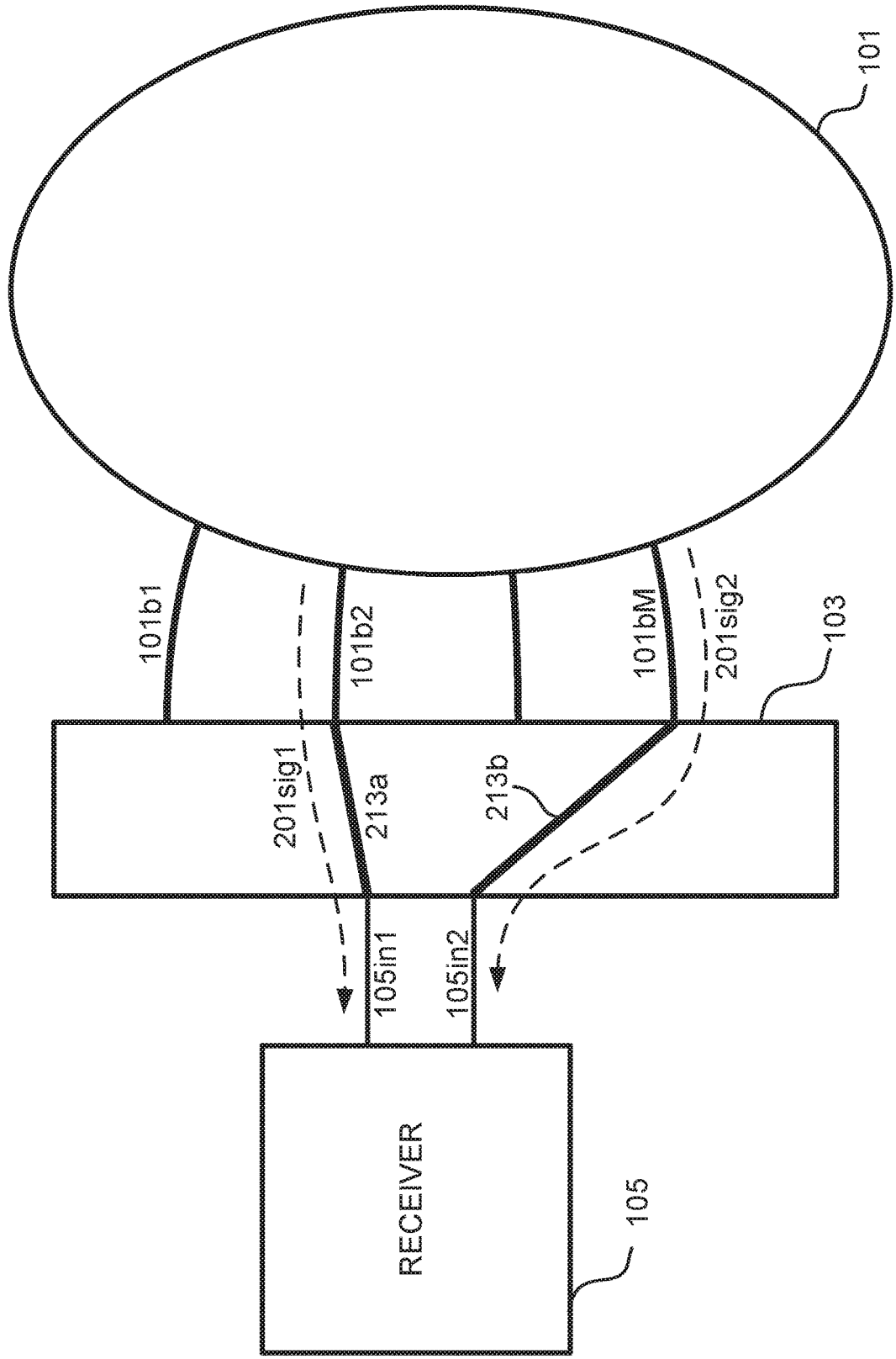
FIG. 2 illustrates one embodiment of switching signals by a radio-frequency switching fabric.

FIG. 1A, FIG. 1B, FIG. 1C, FIG. 1D, FIG. 1E, and FIG. 2 illustrate embodiments of receiving spatially multiplexed wireless signals via a beam-forming network. A wireless communication system 100 includes a beam-forming network 101 which includes a plurality of beam-ports 101$b$1, 101$b$2, 101$b$M. Wireless communication system 100 detects a first 201angle1 and a second 201angle2 directions through which a first wireless signal 201sig1 and a second wireless signal 201sig2 arrive at said wireless communication system 100 respectively, said first and second wireless signals are a mixture of a first and a second spatially multiplexed wireless signals generated by a remote transceiver 285 from a single data stream 299$a$ using a first 286$a$ and a second 286$b$ remote antennas respectively.

Wireless communication system 100 then: (i) connects 213$a$ a first 101$b$2 of said beam-ports, that is associated with first direction 201angle1, to a first input 105in1 of a receiver 105 belonging to wireless communication system 100, and (ii) connects 213$b$ a second 101$b$M of said beam-ports, that is associated with second direction 201angle2, to a second input 105in2 of receiver 105. Receiver 105 then decodes the first and second wireless signals 201sig1, 201sig2, received via said first and second inputs into said single data stream 299$b$.

In one embodiment, said detection is done utilizing at most a first 4 microsecond 239$a$ of a wireless data packet 239 belonging to said data stream, arriving at wireless communication system 100. In one embodiment, said connection is done at most 2 microseconds 239$b$ after said detection. In one embodiment, said detection and said connection are done fast enough, thereby allowing receiver 105 enough time 239$c$ to decode wireless data packet 239. In one embodiment, said first 4 microseconds of wireless data packet 239 contains preamble information, thereby said connection may occur within said 4 microseconds without losing any data belonging to said single data stream.

In one embodiment, wireless data packet 239 and said spatially multiplexed wireless signals at least partially conform to IEEE-802.11n. In one embodiment, said first and second spatially multiplexed wireless signals are used by the IEEE-802.11n standard to boost transmission rates of single data stream 299$a$. In one embodiment, said spatially multiplexed wireless signals are transported using a frequency range of between 2.4 Ghz and 2.5 Ghz, and beam-forming network 101 operates directly in said frequency range. In one embodiment, said spatially multiplexed wireless signals are transported using a frequency range of between 4.8 Ghz and 5.9 Ghz, and beam-forming network 101 operates directly in said frequency range. In one embodiment, wireless data packet 239 and said spatially multiplexed wireless signals at least partially conform to IEEE-802.11ac. In one embodiment, wireless data packet 239 and said spatially multiplexed wireless signals at least partially conform to IEEE-802.11. In one embodiment, said at most first 4 microseconds of wireless data packet 239 contains preamble information, thereby said connection may occur after said detection without losing any data belonging to single data stream 299a.

In one embodiment, beam-forming network 101 is a rotman-lens. In one embodiment, beam-forming network 101 is a butler-matrix. In one embodiment, beam-forming network 101 is a blass-matrix. In one embodiment, beam-forming network 101 is a fixed or passive beam-forming network. In one embodiment, beam-forming network 101 includes a plurality of array-ports 101a1, 101a2, 101aN. In one embodiment, said rotman-lens or butler-matrix concentrates radio-frequency energy arriving at said plurality of array ports into substantially one of said plurality of beam-ports which is determined substantially by an angle of arrival of said radio-frequency energy into said plurality of array ports, thereby said rotman-lens or butler-matrix facilitates detection of said first and second directions through which said first and second wireless signals arrive at wireless communication system 100.

Figure 3:
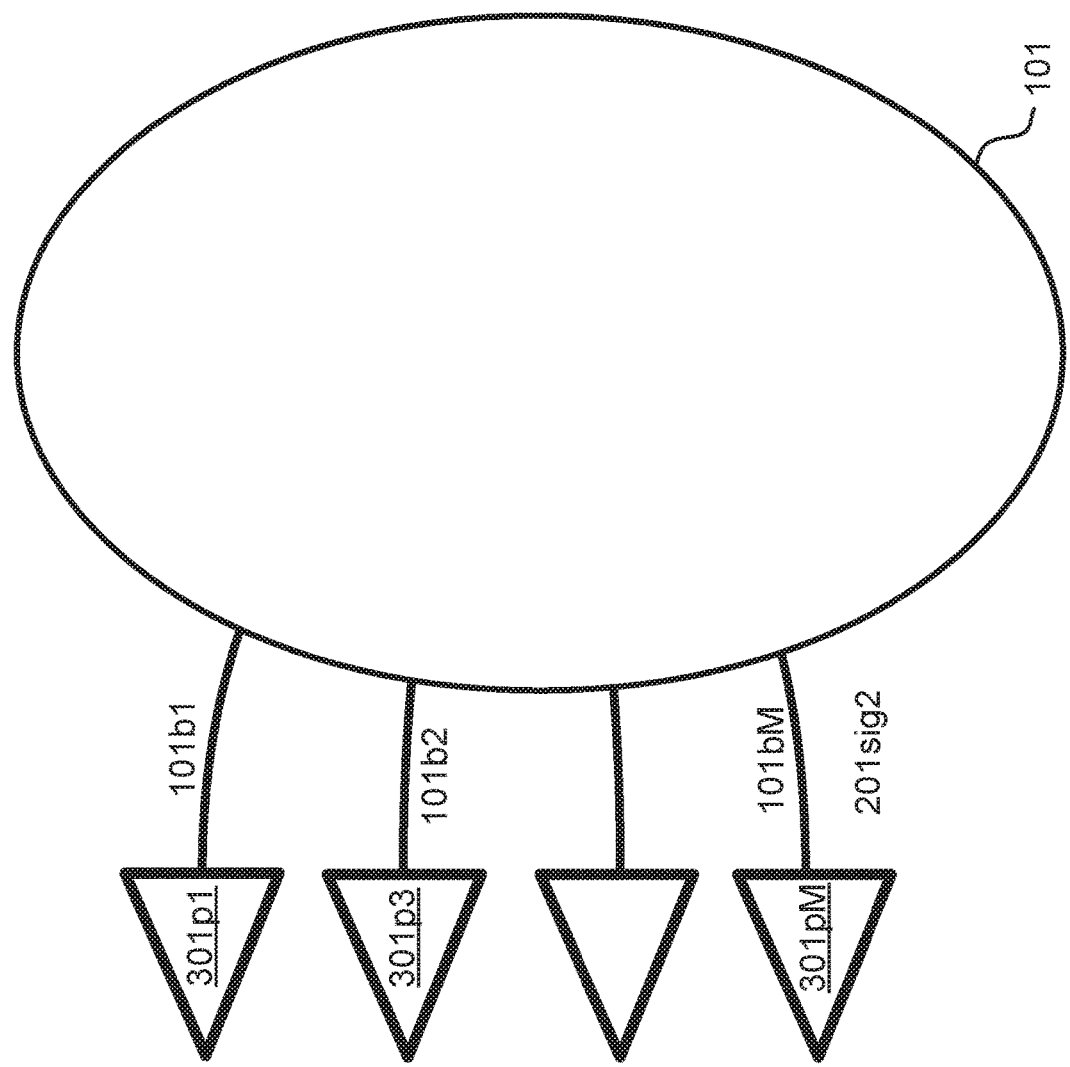
FIG. 3 illustrates one embodiment of power detectors.
Figure 4:
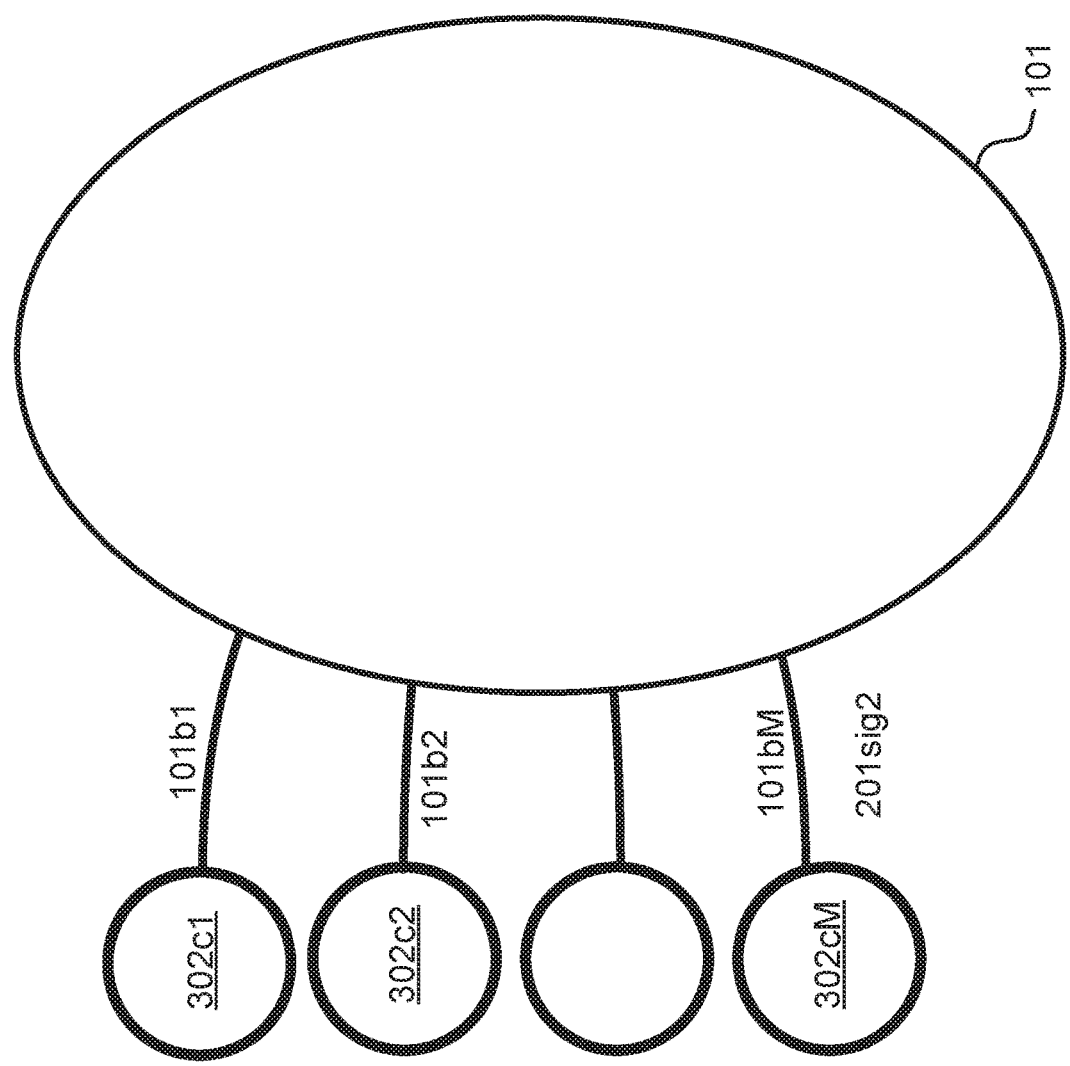
FIG. 4 illustrates one embodiment of correlators.

FIG. 3 and FIG. 4 illustrate embodiments of power detectors and correlators. In one embodiment, said detection of first direction 201angle1 and second direction 201angle2 is done as follows: a plurality of power detectors 301p1, 301p2, 301pM measure a plurality of output power levels of at least some of said plurality of beam-ports respectively. Power detectors 301p1, 301p2, 301pM are connected to beam-ports 101b1, 101b2, 101bM respectively. Wireless communication system 100 then identifies said first 101b2 and second 101bM beam-ports having strongest of said plurality of output power levels, thereby detecting said first and second directions 201angle1, 201angle2, associated with said first and a second wireless signals 201sig1, 201sig2 respectively. In one embodiment, said identification of said first 101b2 and second 101bM beam-ports may include: (i) sensing 302c2 by wireless communication system 100 a first signature belonging to said first spatially multiplexed wireless signal, said first signature present at said first beam-port 101b1, thereby associating said first beam-port with said first spatially multiplexed wireless signal, and (ii) sensing 302cM, by wireless communication system 100, a second signature belonging to said second spatially multiplexed wireless signal, said second signature present at second beam-port 101bM, thereby associating said second beam-port with said second spatially multiplexed wireless signal.

In one embodiment, said detection of first and second directions 201angle1, 201angle2, in done as follows: wireless communication system 100 measures a plurality of output power levels of at least some of said plurality of beam-ports using power detectors 301p1, 301p2, 301pM connected to beam-ports 101b1, 101b2, 101bM respectively. Then, wireless communication system 100 identifies, according to said measurements, a set of beam-ports having strongest of said plurality of output power levels. Wireless communication system 100 then searches 302c1, 302c2, and 302cM among said set of beam-ports for a first and a second signatures belonging to said first and second spatially multiplexed wireless signal respectively. Wireless communication system 100 then identifies at least said first signature as being present at said first beam-port 101b2, and at least said second signature as being present at said second beam-port 101bM, thereby associating said first and second spatially multiplexed wireless signals with said first and second beam-ports, thereby achieving said detection.

In one embodiment, said detection of first and second directions 201angle1, 201angle2, in done as follows: wireless communication system 100 searches 302c1, 302c2, 302cM among said plurality of beam-ports for a first and a second signatures belonging to said first and second spatially multiplexed wireless signals respectively. wireless communication system 100 then identifies at least said first signature as being present at said first beam-port 101b2, and at least said second signature as being present at said second beam-port 101bM, thereby associating said first and second spatially multiplexed wireless signals with said first and second beam-ports, thereby associating said first and second spatially multiplexed wireless signals with said first and second directions 201angle1, 201angle2, thereby achieving said detection.

In one embodiment, said detection, connection, and decoding, involves a third wireless signal which is a mixture of said first spatially multiplexed wireless signal, said second spatially multiplexed wireless signal, and a third spatially multiplexed wireless signal. In one embodiment, said detection, connection, and decoding, involves a third and a fourth wireless signals which are a mixture of said first spatially multiplexed wireless signal, said second spatially multiplexed wireless signal, a third spatially multiplexed wireless signal, and a fourth spatially multiplexed wireless signal.

Figure 5A:
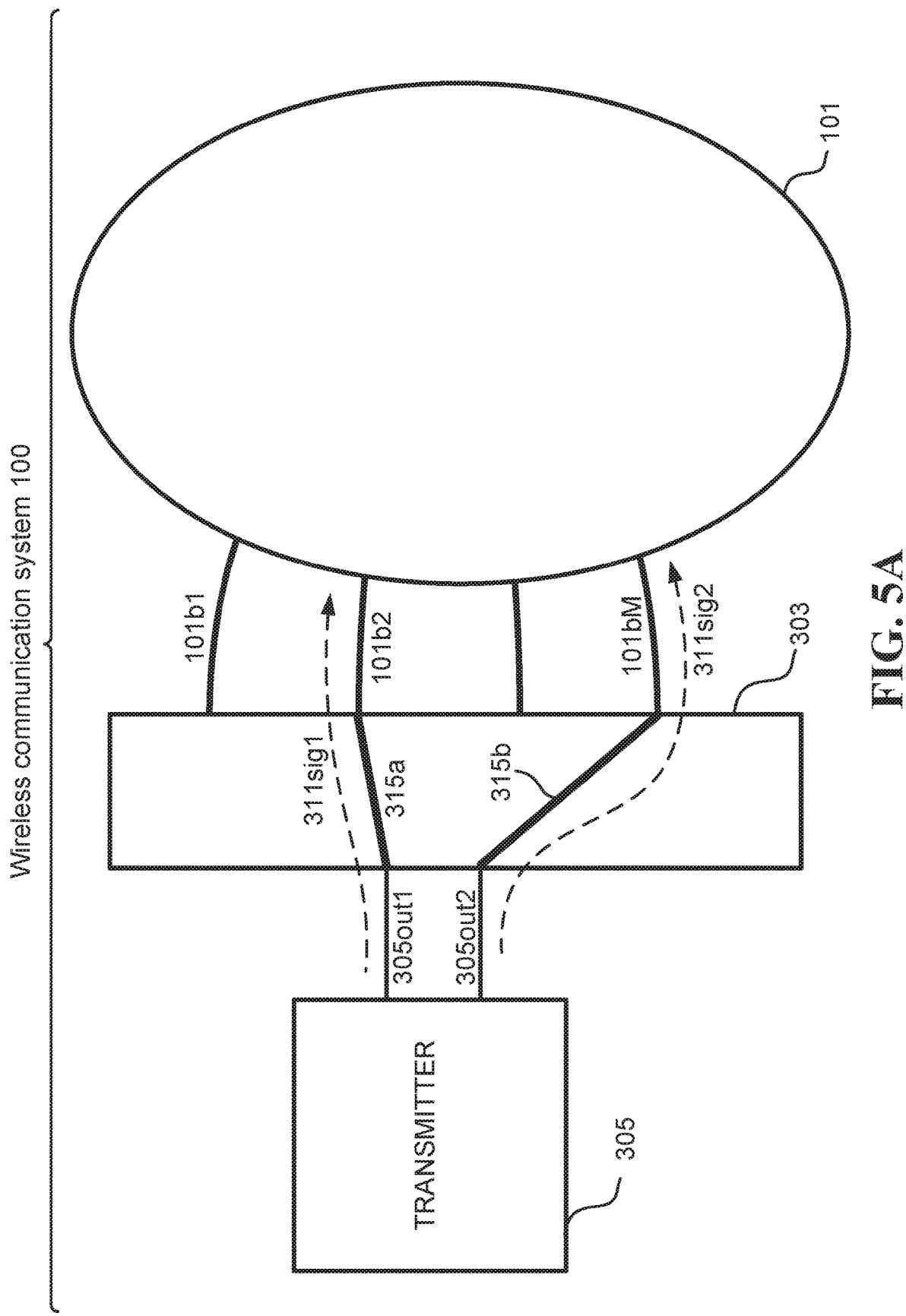
FIG. 5A illustrates one embodiment of a transmitter transmitting via a beam-forming network.
Figure 5B:
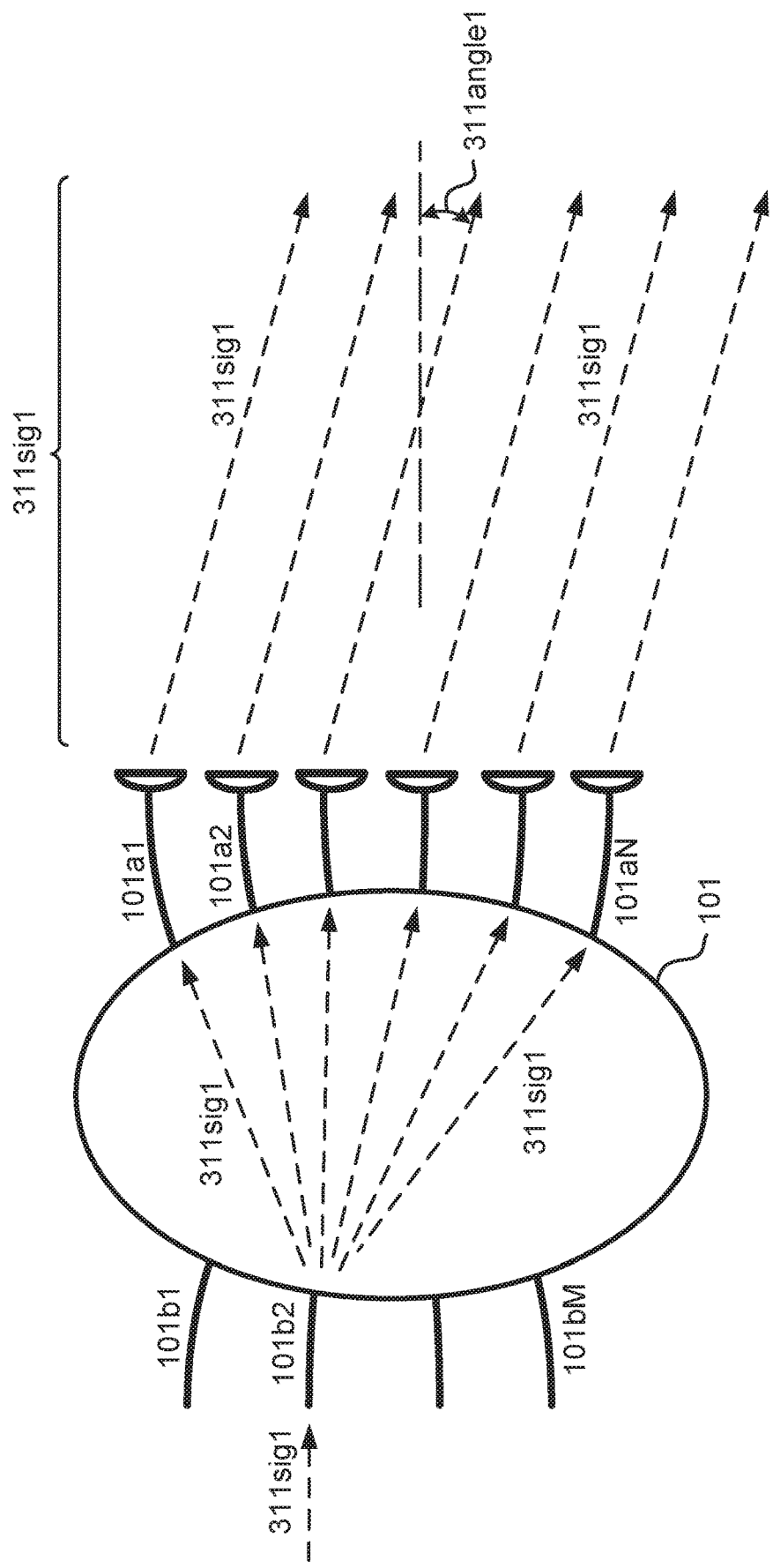
FIG. 5B illustrates one embodiment of directing a first signal via a beam-forming network.
Figure 5C:
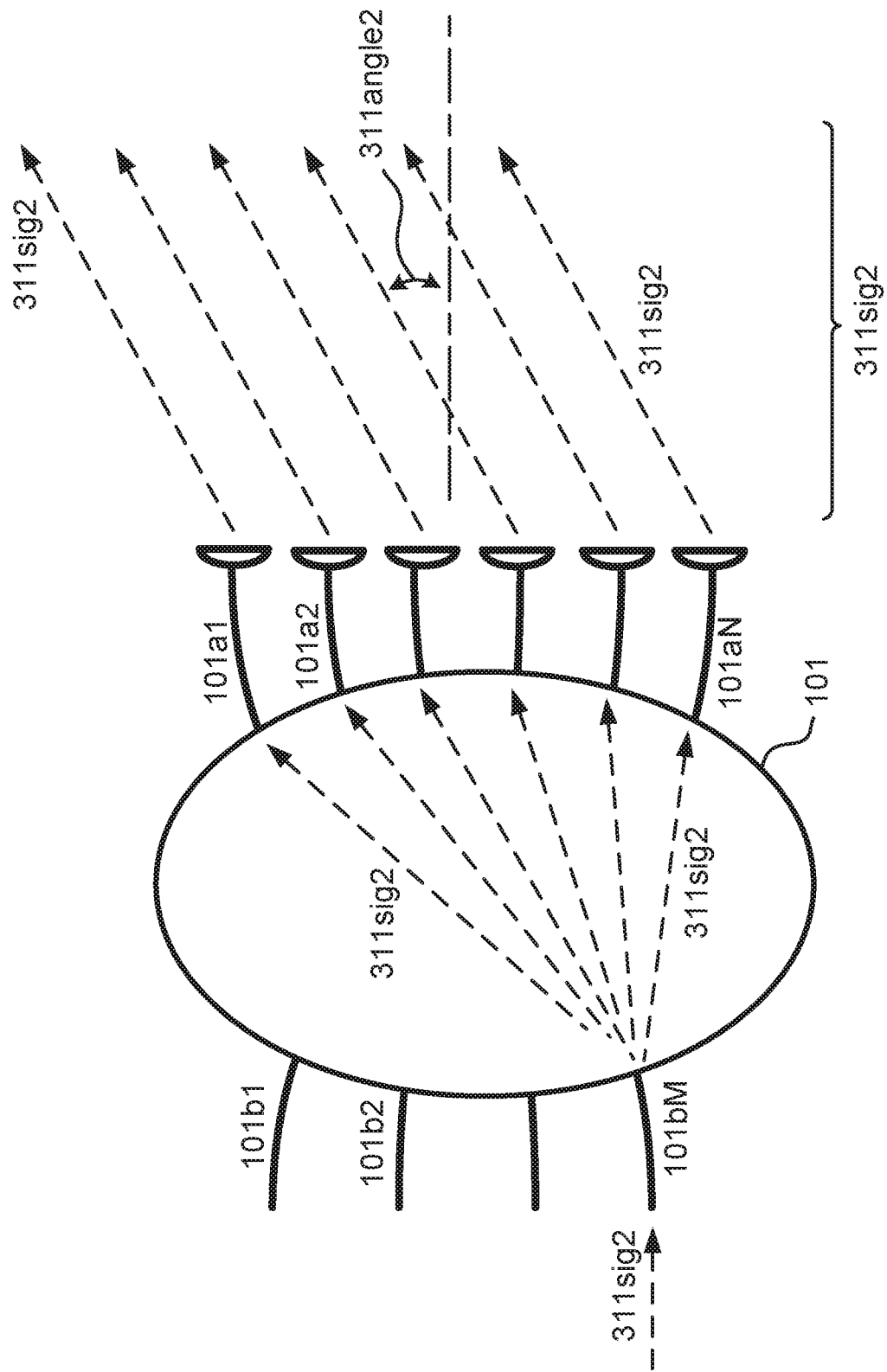
FIG. 5C illustrates one embodiment of directing a second signal via a beam-forming network.

FIG. 5A, FIG. 5B, and FIG. 5C illustrate embodiments of transmitting via a beam-forming network. In one embodiment, wireless communication system 100 uses a radio frequency switching fabric 303 to: (i) connect 315a a first output 305out1 of a transmitter 305 to said first beam port 101b2, and (ii) connect 315b a second output 305out2 of said transmitter to said second beam port 101bM. Wireless communication system 100 then transmits using said transmitter: (i) a first wireless transmit signal 311sig1 via said first output, and (ii) a second wireless transmit signal 311sig2 via said second output, thereby: (i) directing 311angle1 said first wireless transmit signal 311sig1 toward remote transceiver 285, and (ii) directing 311angle2 said second wireless transmit signal 311sig2 toward remote transceiver 285. In one embodiment, said first and second wireless transmit signals are two spatially multiplexed signals intended for decoding by said remote transceiver into a single data stream. In one embodiment, said first and second wireless transmit signals are two cyclic-delay-diversity signals intended for decoding by said remote transceiver.

In one embodiment, wireless communication system 100 together with remote transceiver 285 constitute a multiple-input-multiple-output communication system.

In one embodiment, a reception range of spatially multiplexed wireless signals is boosted using a rotman-lens or butler-matrix. A rotman-lens or butler-matrix 101, comprising a plurality of beam-ports 101b1, 101b2, 101bM, concentrates a first wireless signal 201sig1 arriving at a plurality of array ports 101a1, 101a2, 101aN belonging to said rotman-lens or butler-matrix, substantially into one 101b2 of said plurality of beam-ports, said one of beam-ports is determined substantially by an angle of arrival 201angle1 of said first wireless signal into said plurality of array ports.

Rotman-lens or butler-matrix 101 concentrates a second wireless signal 201sig2 arriving at said plurality of array ports, substantially into another 101bM of said plurality of beam-ports, said another beam-ports is determined substantially by an angle of arrival 201angle2 of said second wireless signal into said plurality of array ports. The first 201sig1 and second 201sig2 wireless signals are a mixture of a first and a second spatially multiplexed wireless signals generated by a remote transceiver 285 from a single data stream 299a using a first 286a and a second 286b remote antennas respectively. Wireless communication system 100 detects presence of said first and second wireless signals 201sig1, 201sig2 at said one and another 101b2, 101bM of beam-ports respectively, out of a possibility of presence at other beam-ports of said plurality of beam-ports. Wireless communication system 100 connects 213a, 213b: (i) said one beam-port 101b2 to a first input 105in1 of a receiver 105 belonging to said wireless communication system, and (ii) said another beam-port 101bM to a second input 105in2 of said receiver. Receiver 105 then decodes said first wireless signal 201sig1 arriving via said first input 105in1, together with said second wireless signal 201sig2 arriving via said second input 105in2, into said single data stream 299b.

In one embodiment, said detection is done as follows: (i) measuring a plurality of output power levels of at least some of said plurality of beam-ports 101b1, 101b2, 101bM respectively, by using a plurality of power detectors 301p1, 301p2, 301pM connected to said plurality of beam-ports respectively, said plurality of power detectors belonging to wireless communication system 100, and (ii) identifying, by wireless communication system 100, said one beam-port 101b2 and said another beam-port 101bM as having strongest of said plurality of output power levels.

In one embodiment, said detection is done as follows: (i) searching 302c1, 302c2, 302cM, by wireless communication system 100, among said plurality of beam-ports 101b1, 101b2, 101bM, for a first and a second signatures belonging to said first and second spatially multiplexed wireless signal respectively, (ii) identifying at least said first signature as being present at said one beam-port 101b2, and at least said second signature as being present at said another beam-port 101bM, thereby detecting said one and another of beam-ports 101b2, 101bM out of said plurality of beam-ports.

In one embodiment, wireless communication system 100 receives from a remote transceiver 285, via a plurality of antennas 109a1, 109a2, 109aN connected to said plurality of array-ports 101a1, 101a2, 101aN respectively, said first and second wireless signals 201sig1, 201sig2, thereby facilitating a substantial array gain associated with said plurality of antennas.

In one embodiment, a wireless communication system 100 boosts reception range of wireless signals using a rotman-lens or butler-matrix. A rotman-lens or butler-matrix 101, comprising a plurality of beam-ports 101b1, 101b2, 101bM, is operative to: (i) focus a first wireless signal 201sig1 arriving at a plurality of array ports 101a1, 101a2, 101aN belonging to said rotman-lens or butler-matrix, substantially into one of said plurality of beam-ports 101b2, said one of beam-ports is determined substantially by an angle of arrival 201angle1 of said first wireless signal into said plurality of array ports, and (ii) focus a second wireless signal 201sig2 arriving at said plurality of array ports, substantially into another of said plurality of beam-ports 101bM, said another beam-ports is determined substantially by an angle of arrival 201angle2 of said second wireless signal into said plurality of array ports. A wireless communication system 100, to which said rotman-lens or butler-matrix 101 belongs, detects presence of said first 201sig1 and second 201sig2 wireless signals at said one 101b2 and another 101bM of beam-ports respectively. A radio-frequency switching fabric 103: (i) connects 213a said one beam-port 101b2 to a first input 105in1 of a receiver 105 belonging to wireless communication system 100, and (ii) connects 213b said another beam-port 101bM to a second input 105in2 of said receiver.

In one embodiment, said first and second wireless signals 201sig1, 201sig2 are a mixture of a first and a second spatially multiplexed wireless signals generated by a remote transceiver 285 from a single data stream 299a using a first 286a and a second 286b remote antennas respectively, and said receiver 105 is operative to decode said first wireless signal 201sig1 arriving via said first input 105in1, together with said second wireless signal 201sig2 arriving via said second input 105in2, into said single data stream 299b.

In one embodiment, a plurality of power detectors 301p1, 301p2, 301pM is connected to said plurality of beam-ports 101b1, 101b2, 101bM respectively. Said power detectors measure a plurality of output power levels of at least some of said plurality of beam-ports respectively. Wireless communication system 100 identifies said one beam-port 101b2 and said another beam-port 101bM as having strongest of said plurality of output power levels.

In one embodiment, at least one correlator 302c1, 302c2, 302cM, belonging to said wireless communication system 100, is operative to: (i) search, among said plurality of beam-ports 101b1, 101b2, 101bM, for a first and a second signatures belonging to said first and second spatially multiplexed wireless signal respectively, and (ii) identify at least said first signature as being present at said one beam-port 101b2, and at least said second signature as being present at said another beam-port 101bM, thereby detecting said one and another of beam-ports, out of said plurality of beam-ports.

In one embodiment, a plurality of antennas 109a1, 109a2, 109aN connects to said plurality of array-ports 101a1, 101a2, 101aN respectively. Antennas 109a1, 109a2, 109aN receive from a remote transceiver said first and second wireless signals 201sig1, 201sig2, thereby facilitating a substantial array gain associated with said plurality of antennas. In one embodiment said plurality of antennas produce a gain in excess of 10 dBi. In one embodiment, said plurality of antennas produce a gain in excess of 14 dBi. In one embodiment, said pluralities of antennas produce a gain in excess of 18 dBi. In one embodiment, there are 4 of said plurality of antennas present. In one embodiment, there are 4 of said plurality of array-ports, and 8 of said plurality of beam-ports present. In one embodiment, there are 6 of said plurality of antennas present. In one embodiment, there are 6 of said plurality of array-ports, and 8 of said plurality of beam-ports present. In one embodiment, there are 6 of said plurality of array-ports, and 16 of said plurality of beam-ports present. In one embodiment, there are 8 of said plurality of antennas present. In one embodiment, said rotman-lens or butler-matrix 101 and radio-frequency switching fabric 103 operate at a frequency range of between 2.4 Ghz and 2.5 Ghz. In one embodiment, said rotman-lens or butler-matrix 101 and radio-frequency switching fabric 103 operate at a frequency range of between 4.8 Ghz and 5.8 Ghz.

Figure 6:
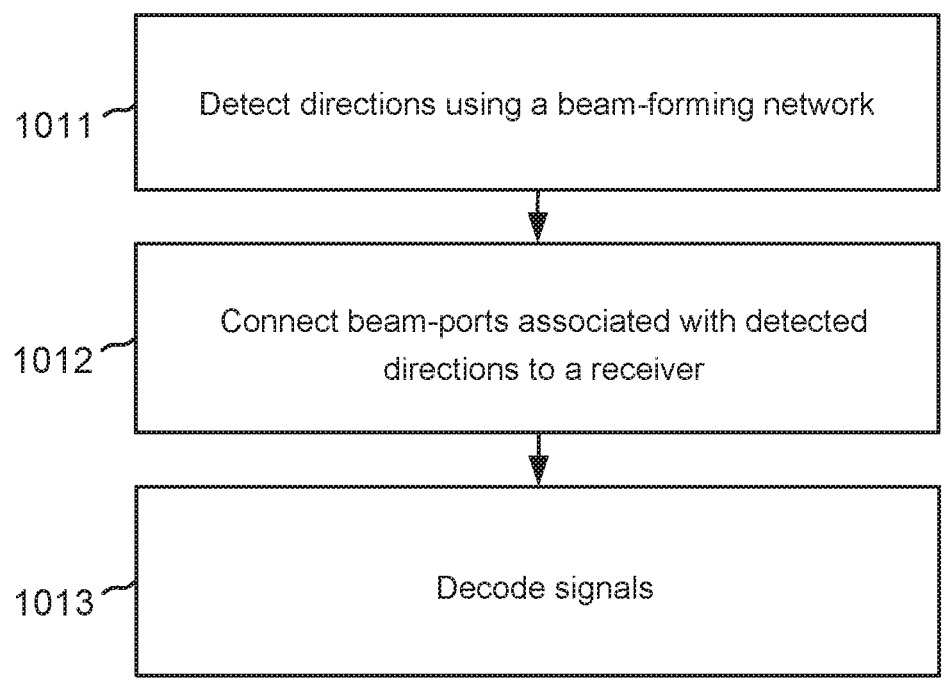
FIG. 6 is one embodiment of a flow diagram for receiving signals.

FIG. 6 is a flow diagram illustrating one embodiment of receiving spatially multiplexed wireless signals via a beam-forming network. In step 1011: detecting, using a beam-forming network 101 comprising a plurality of beam-ports 101b1, 101b2, 101bM and belonging to a wireless communication system 100, a first 201angle1 and a second 201angle2 directions through which a first 201sig1 and a second 201sig2 wireless signals arrive at said wireless communication system respectively, said first and second wireless signals are a mixture of a first and a second spatially multiplexed wireless signals generated by a remote transceiver 285 from a single data stream 299a using a first 286a and a second 286b remote antennas respectively. In step 1012: connecting 213a, 213b, by said wireless communication system 100: (i) a first 101b2 of said beam-ports, that is associated with said first direction, to a first input 105in1 of a receiver 105 belonging to wireless communication system 100, and (ii) a second 101bM of said beam-ports, that is associated with said second direction, to a second input 105in2 of said receiver. In step 1013: decoding, by said receiver, the first and second wireless signals 201sig1, 201sig2 received via said first and second inputs 105in1, 105in2, into said single data stream 299b.

Figure 7:
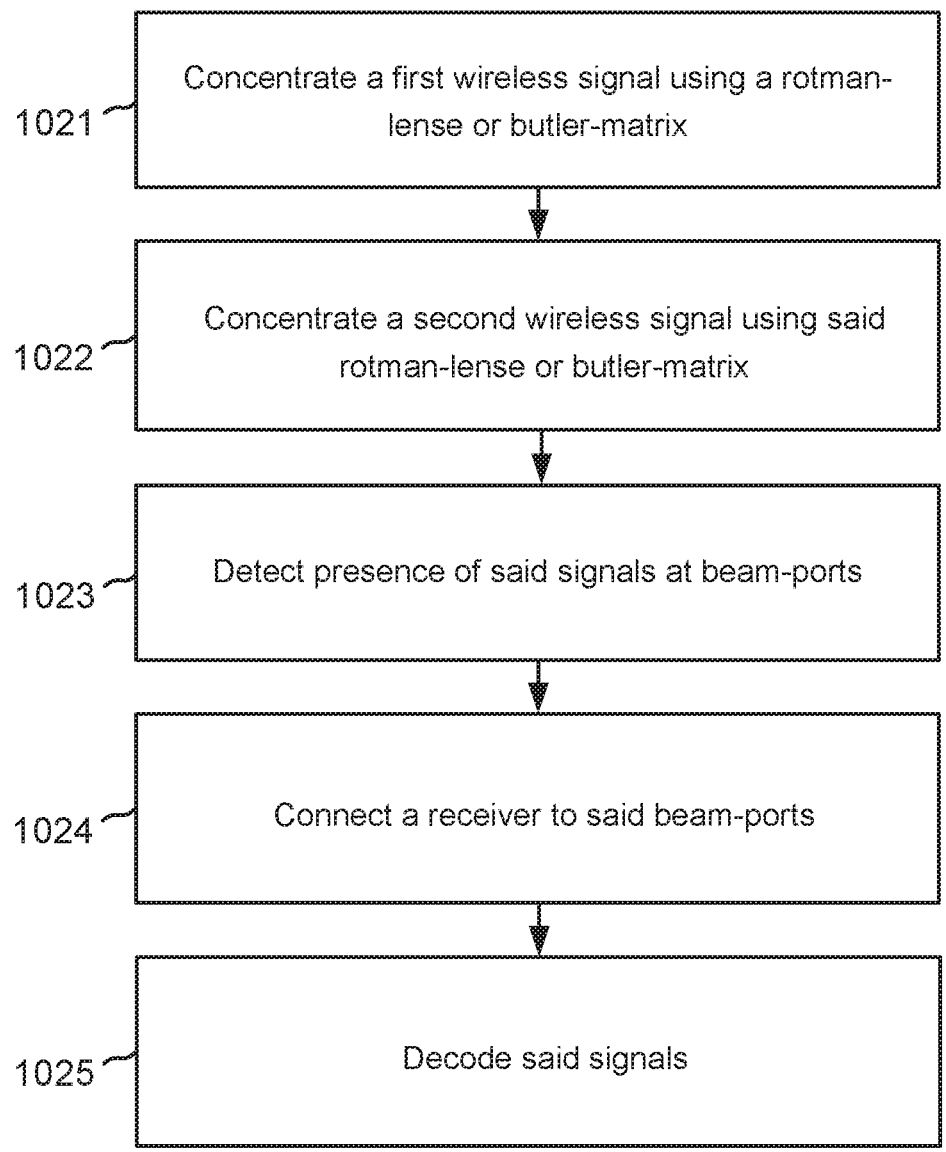
FIG. 7 is one embodiment of a flow diagram for receiving signals.

FIG. 7 is a flow diagram illustrating one embodiment of boosting reception range of spatially multiplexed wireless signals using a rotman-lens or butler-matrix. In step 1021: concentrating, by a rotman-lens or butler-matrix 101 comprising a plurality of beam-ports 101b1, 101b2, 101bM a first wireless signal 201sig1 arriving at a plurality of array ports 101a1, 101a2, 101aN belonging to said rotman-lens or butler-matrix, substantially into one 101b2 of said plurality of beam-ports, said one of beam-ports is determined substantially by an angle of arrival 201angle1 of said first wireless signal into said plurality of array ports. In step 1022: concentrating, by said rotman-lens or butler-matrix, a second wireless signal 201sig2 arriving at said plurality of array ports, substantially into another 101bM of said plurality of beam-ports, said another beam-ports is determined substantially by an angle of arrival 201angle2 of said second wireless signal into said plurality of array ports, wherein said first and second wireless signals are a mixture of a first and a second spatially multiplexed wireless signals generated by a remote transceiver 285 from a single data stream 299a using a first 286a and a second 286b remote antennas respectively. In step 1023: detecting, by a wireless communication system 100 to which said rotman-lens or butler-matrix belongs, presence of said first and second wireless signals 201sig1, 201sig2 at said one and another of beam-ports 101b2, 101bM respectively, out of a possibility of presence at other beam-ports of said plurality of beam-ports. In step 1024: connecting 213a, 213b by wireless communication system 100: (i) said one beam-port 101b2 to a first input 105in1 of a receiver 105 belonging to said wireless communication system, and (ii) said another beam-port 101bM to a second input 105in2 of said receiver. In step 1025: decoding, by said receiver 105, said first wireless signal 201sig1 arriving via said first input 105in1, together with said second wireless signal 201sig2 arriving via said second input 105in2, into said single data stream 299b.

Figure 8A:
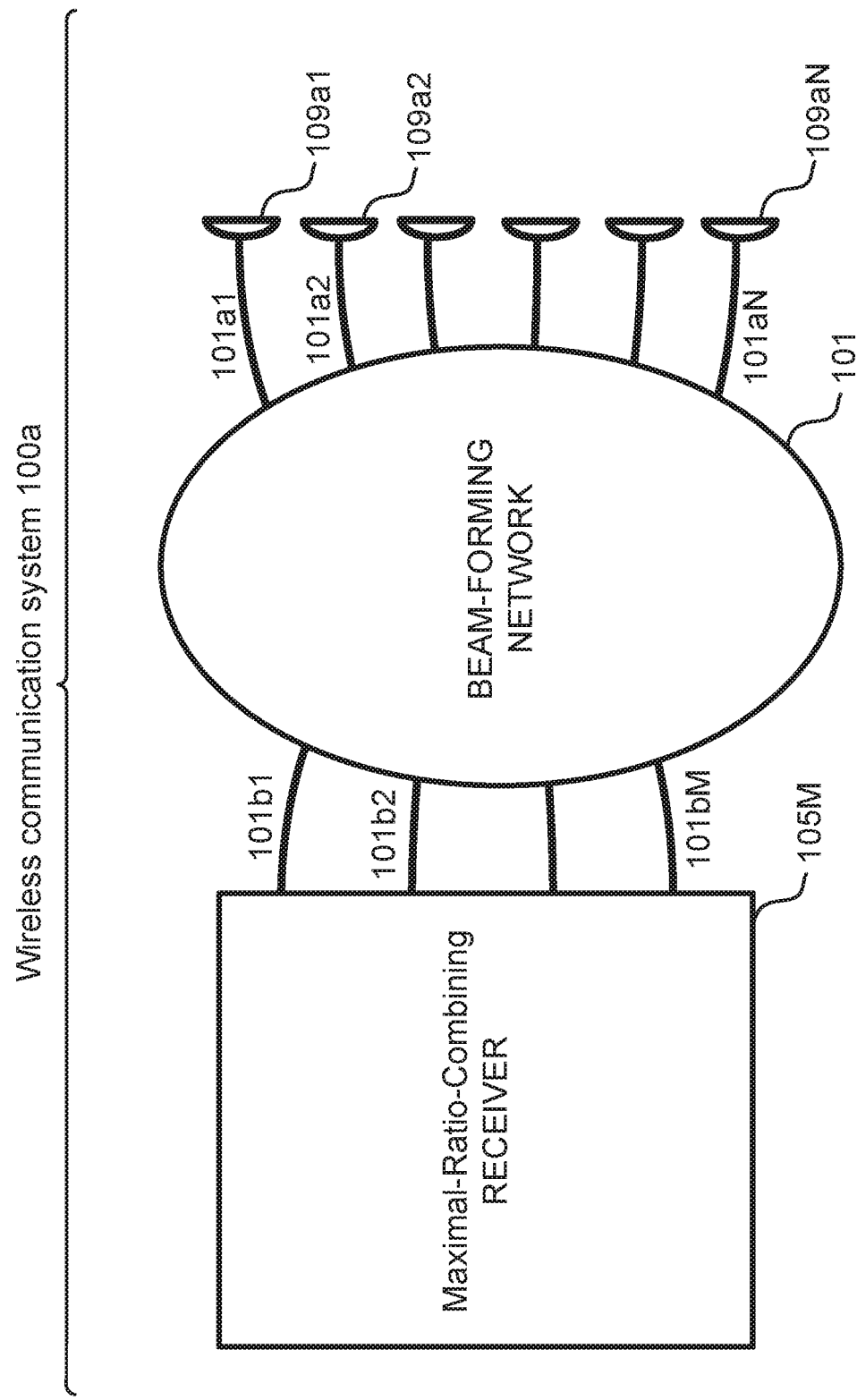
FIG. 8A illustrates one embodiment of a wireless communication system including a receiver and a beam-forming network.
Figure 8B:
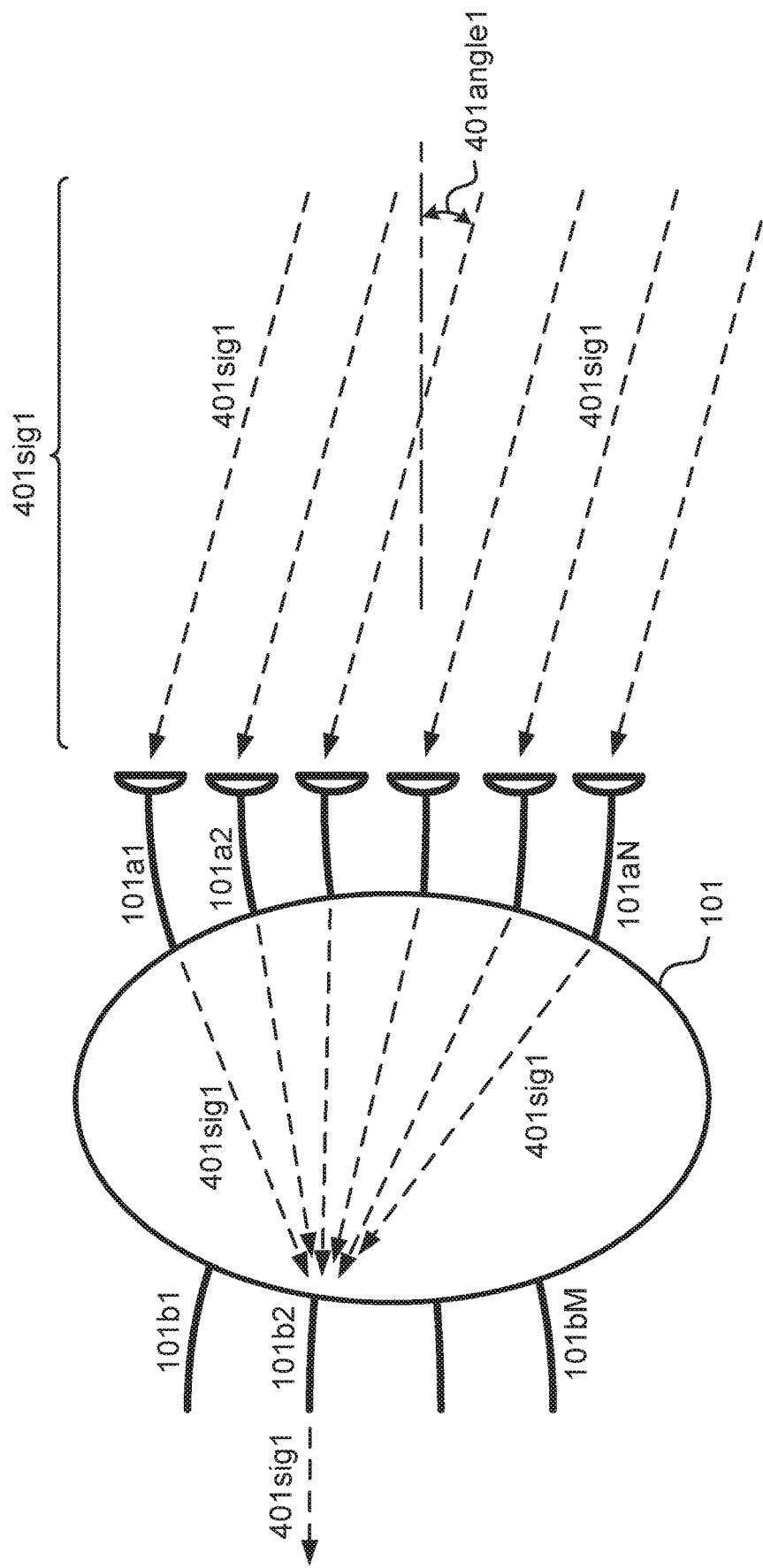
FIG. 8B illustrates one embodiment of a beam-forming network directing a first signal toward one beam-port.
Figure 8C:
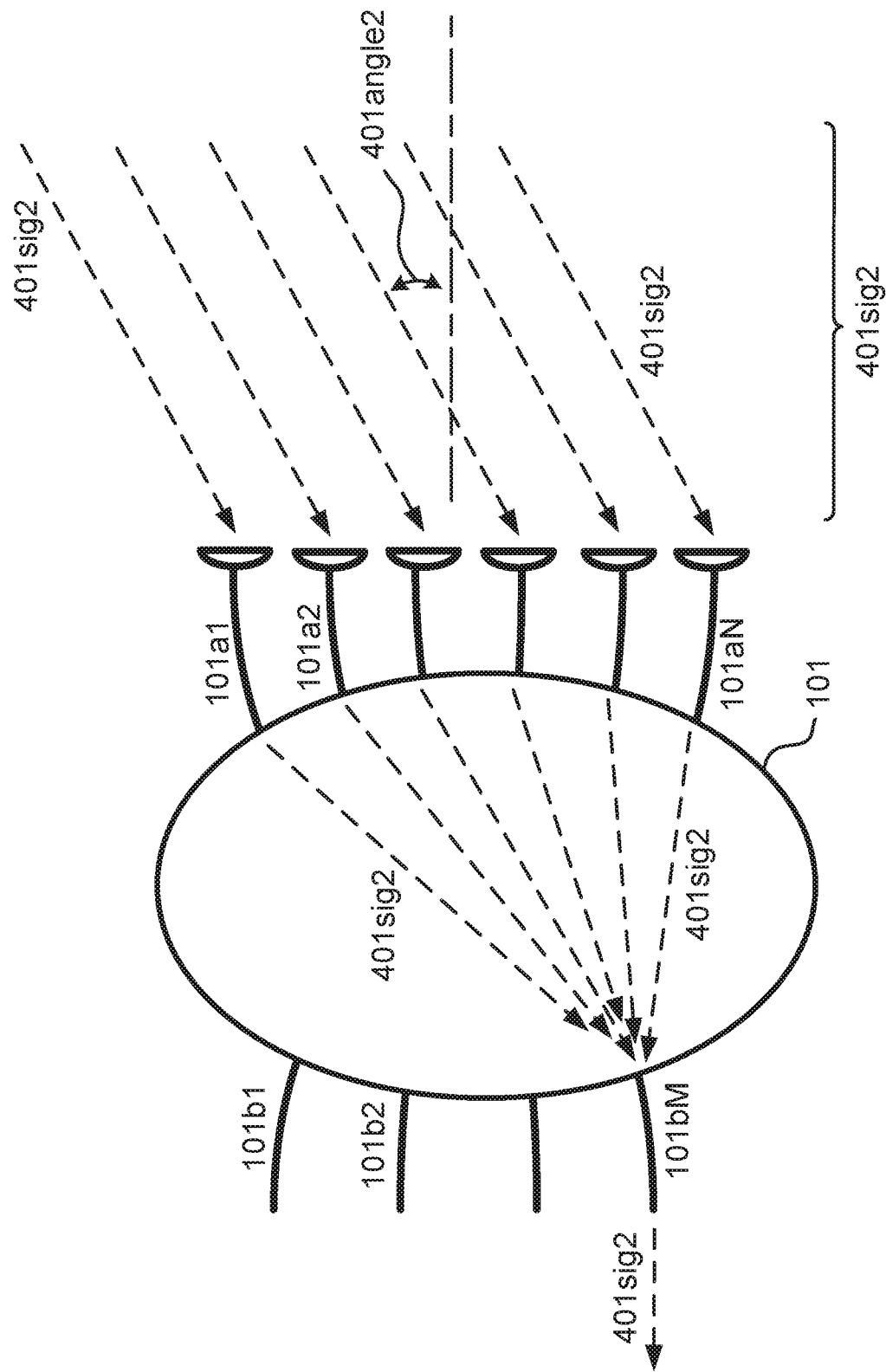
FIG. 8C illustrates one embodiment of a beam-forming network directing a second signal toward another beam-port.

FIG. 8A, FIG. 8B, FIG. 8C illustrate one embodiment for receiving multiple signals using maximal-ratio-combining and a beam-forming network. A beam-forming network 101 comprising a plurality of beam-ports 101b1, 101b2, 101bM concentrates: (i) a first wireless signal 401sig1 arriving at a plurality of array ports 101a1, 101a2, 101aN belonging to said beam-forming network, substantially into one 101b2 of said plurality of beam-ports, and (ii) a second wireless signal 401sig2 arriving at said plurality of array ports, substantially into another 101bM of said plurality of beam-ports, said second wireless signal is a multi-path version of said first wireless signal. A receiver 105M combines said first and second wireless signals, which arrive at said receiver via said one and another of beam-ports respectively, into a third resulting signal, using maximal-ratio-combining, thereby optimizing quality of said third resulting signal. In one embodiment, said one of beam-ports 101b2 is determined substantially by an angle of arrival 401angle1 of said first wireless signal 401sig1 into said plurality of array ports, and said another beam-ports 101bM is determined substantially by an angle of arrival 401angle2 of said second wireless signal 401sig2 into said plurality of array ports.

In one embodiment, said beam-forming network 101 is selected from a group consisting of: (i) a rotman-lens, (ii) a butler-matrix, (iii) a blass-matrix, and (iv) a fixed or passive beam-forming network.

In one embodiment, said first wireless signals 401sig1 is an orthogonal-frequency-division-multiplexing signal or an orthogonal-frequency-division-multiple-access signal, having a plurality of sub-carriers. In one embodiment, said maximal-ratio-combining is done at a level of said plurality of sub-carriers. In one embodiment, said first wireless signals 401sig1 is a direct-sequence-spread-spectrum signal or cck modulated signal.

In one embodiment, wireless communication system 100a to which said beam-forming network 101 and receiver 105M belong, uses information from said maximal-ratio-combining to generate a first and a second transmit signals which are coherent, and transmits said first and a second transmit signals via said one 101b2 and another 101bM of said beam-ports respectively.

In one embodiment, a wireless communication system 100a boosts reception range of wireless signals using a rotman-lens or butler-matrix as follows: a rotman-lens or butler-matrix 101 comprising a plurality of beam-ports 101b1, 101b2, 101bM is operative to: (i) focus a first wireless signal 401sig1 arriving at a plurality of array ports 101a1, 101a2, 101aN belonging to said rotman-lens or butler-matrix, substantially into one 101b2 of said plurality of beam-ports, said one of beam-ports is determined substantially by an angle of arrival 401angle1 of said first wireless signal into said plurality of array ports, and (ii) focus a second wireless signal 401sig2 that is a multi-path version of said first wireless signal, arriving at said plurality of array ports, substantially into another 101bM of said plurality of beam-ports, said another beam-port is determined substantially by an angle of arrival 401angle2 of said second wireless signal into said plurality of array ports; and a receiver 105M, is operative to combine said first and second wireless signals 401sig1, 401sig2, which arrive at said receiver via said one and another of beam-ports respectively, into a third resulting signal, using maximal-ratio-combining, thereby optimizing quality of said third resulting signal.

In one embodiment, said first wireless signal 401sig1 is an orthogonal-frequency-division-multiplexing signal or an orthogonal-frequency-division-multiple-access signal, having a plurality of sub-carriers. In one embodiment, said maximal-ratio-combining is done at a level of said plurality of sub-carriers. In one embodiment, said first wireless signals is a direct-sequence-spread-spectrum signal or cck modulated signal. In one embodiment, said first and second wireless signals 401sig1, 401sig2 conform at least partially to IEEE-802.11n or IEEE-802.11ac. In one embodiment, said wireless signals 401sig1, 401sig2 are transported using a frequency range of between 2.4 Ghz and 2.5 Ghz, and said rotman-lens or butler-matrix 101 is configured to operate directly in said frequency range. In one embodiment, said wireless signals 401sig1, 401sig2 are transported using a frequency range of between 4.8 Ghz and 5.8 Ghz, and said rotman-lens or butler-matrix is configured to operate directly in said frequency range.

In one embodiment, a plurality of antennas 109a1, 109a2, 109aN connected to said plurality of array-ports 101a1, 101a2, 101aN respectively, receive from a remote transceiver said first and second wireless signals 401sig1, 401sig2, thereby facilitating a substantial array gain associated with said plurality of antennas. In one embodiment said plurality of antennas produce a gain in excess of 10 dBi. In one embodiment, said plurality of antennas produce a gain in excess of 14 dBi. In one embodiment, said pluralities of antennas produce a gain in excess of 18 dBi. In one embodiment, there are 4 of said plurality of antennas present. In one embodiment, there are 4 of said plurality of array-ports, and 8 of said plurality of beam-ports present. In one embodiment, there are 6 of said plurality of antennas present. In one embodiment, there are 6 of said plurality of array-ports, and 8 of said plurality of beam-ports present. In one embodiment, there are 6 of said plurality of array-ports, and 16 of said plurality of beam-ports present. In one embodiment, there are 8 of said plurality of antennas present.

Figure 9:
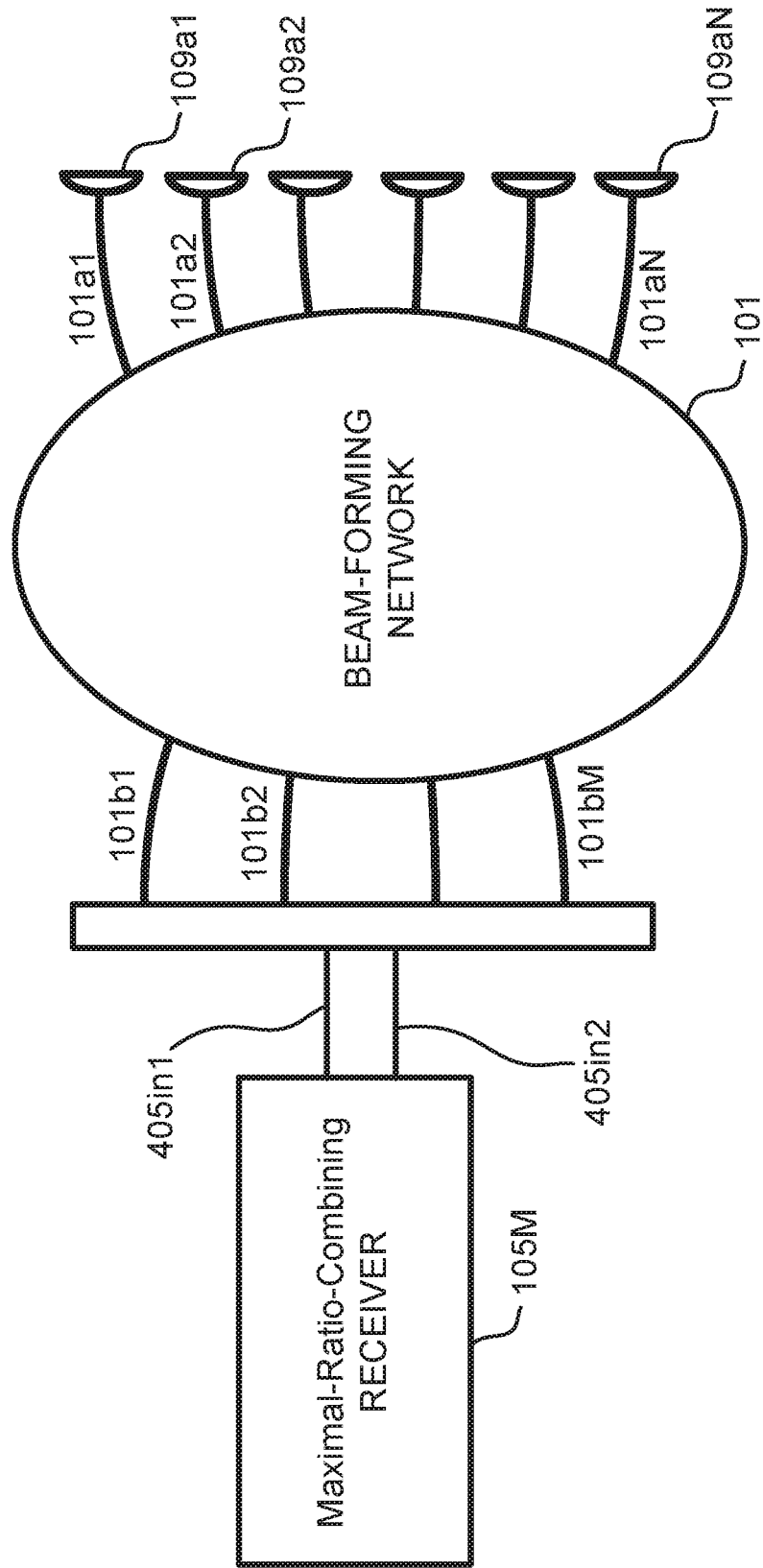
FIG. 9 illustrates one embodiment of a wireless communication system including a receiver and a beam-forming network.

FIG. 9 illustrates one embodiment for receiving multi-path wireless signals via a beam-forming network. A beam-forming network 101 comprising a plurality of beam-ports 101b1, 101b2, 101bM and belonging to a wireless communication system, detects a first and a second directions 401angle1, 401angle2 through which a first and a second wireless signals 401sig1, 401sig2 arrive at said wireless communication system respectively, said second wireless signal 401sig2 is a multi-path version of said first wireless signal 401sig1. Said wireless communication connects: (i) a first of said beam-port 101b2, that is associated with said first direction 401angle1, to a first input 405in1 of a receiver 105M belonging to said wireless communication system, and (ii) a second 101bM of said beam-port, that is associated with said second direction 401angle2, to a second input 405in1 of said receiver. Receiver 105M decodes, using maximal-ratio-combining, the first and second wireless signals 401sig1, 401sig2 received via said first and second inputs.

In one embodiment, said detection of said first and second directions 401angle1, 401angle2 is done as follows: measuring a plurality of output power levels of at least some of said plurality of beam-ports respectively, by using a plurality of power detectors connected to said plurality of beam-ports respectively, said plurality of power detectors belonging to said wireless communication system; and identifying, by said wireless communication system, said first and second beam-ports having strongest of said plurality of output power levels, thereby detecting said first and second directions associated with said first and a second wireless signals respectively. In one embodiment, said detection of said first and second directions may include: searching, by said wireless communication system, among said plurality of beam-ports, for a signature belonging to said first wireless signal; and identifying said first signature as being present at said first and second beam-ports, thereby associating said first and second wireless signals with said first and second beam-ports, thereby associating said first and second wireless signals with said first and second directions, thereby achieving said detection.

Figure 10:
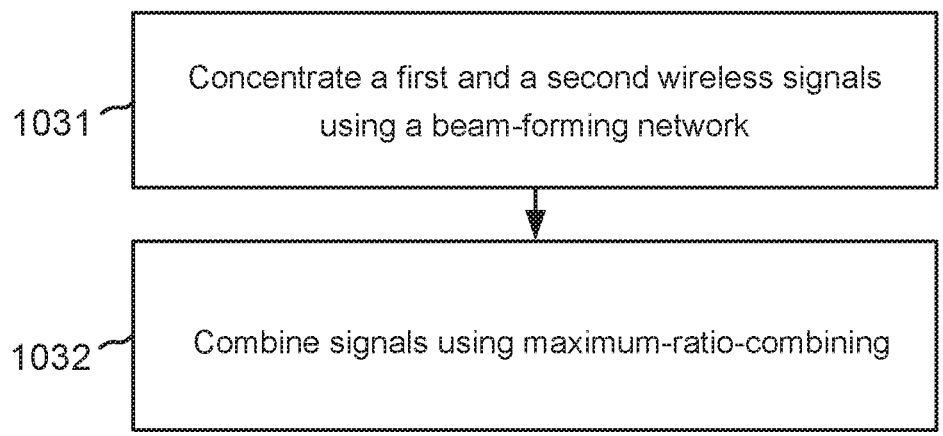
FIG. 10 is one embodiment of a flow diagram for receiving signals.

FIG. 10 is a flow diagram illustrating one embodiment of receiving multiple signals using maximal-ratio-combining and a beam-forming network. In step 1031: concentrating by a beam-forming network 101 comprising a plurality of beam-ports 101b1, 101b2, 101bM: (i) a first wireless signal 401sig1 arriving at a plurality of array ports 101a1, 101a2, 101aN belonging to said beam-forming network, substantially into one 101b2, of said plurality of beam-ports, and (ii) a second wireless signal 401sig2 arriving at said plurality of array ports, substantially into another 101bM of said plurality of beam-ports, said second wireless signal is a multi-path version of said first wireless signal. In step 1032: combining, by a receiver 105M, said first and second wireless signals, which arrive at said receiver via said one and another of beam-ports respectively, into a third resulting signal, using maximal-ratio-combining, thereby optimizing quality of said third resulting signal.

Figure 11:
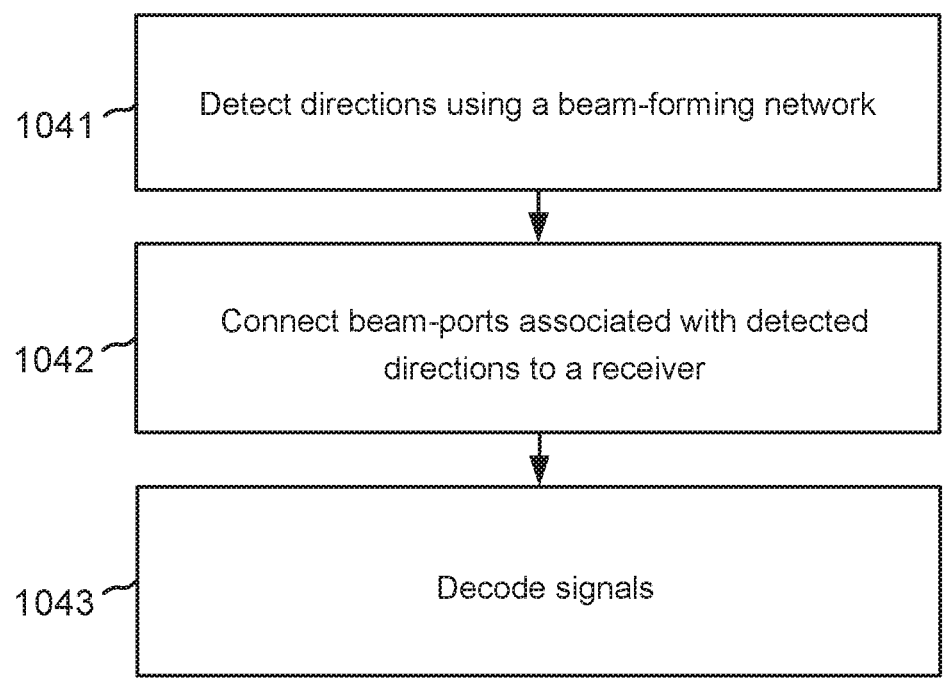
FIG. 11 is one embodiment of a flow diagram for receiving signals.

FIG. 11 is a flow diagram illustrating one embodiment of receiving multi-path wireless signals via a beam-forming network. In step 1041: detecting, using a beam-forming network 101 comprising a plurality of beam-ports 101b1, 101b2, 101bM and belonging to a wireless communication system, a first and a second directions 401angle1, 401angle2 through which a first and a second wireless signals 401sig1, 401sig2 arrive at said wireless communication system respectively, said second wireless signal is a multi-path version of said first wireless signal. In step 1042: connecting, by said wireless communication system: (i) a first of said beam-port 101b2 that is associated with said first direction, to a first input 405in1 of a receiver 101M belonging to said wireless communication system, and (ii) a second 101bM of said beam-port, that is associated with said second direction, to a second input 405in1 of said receiver. In step 1043: decoding using maximal-ratio-combining, by said receiver, the first and second wireless signals received via said first and second inputs.

In one embodiment, a method for selecting receiving directions for wireless data packets, in which each direction is selected separately and dynamically for each wireless data packet, comprises: detecting, using a beam-forming network 101 comprising a plurality of beam-ports 101b1, 101b2, 101bM and belonging to a wireless communication system 100, a direction 201angle1 through which a beginning 239a of a wireless data packet 239 arrives at said wireless communication system; connecting, by said wireless communication system, one of said beam-port 101b2 that is associated with said direction 201angle1, to a receiver 105 belonging to said wireless communication system; and receiving, by said receiver, at least a majority 239c of said wireless data packet via said beam-port.

In one embodiment, said detection is done during a first 4 microsecond 239a of said wireless data packet 239, arriving at wireless communication system 100. In one embodiment, said connection is done at most 2 microseconds 239b after said detection. In one embodiment, said detection and said connection are done fast enough, thereby allowing receiver 105 enough time 239c to decode wireless data packet 239. In one embodiment, said first 4 microseconds of wireless data packet 239 contains preamble information, thereby said connection may occur within said 4 microseconds without losing any data belonging to said single data stream. In one embodiment, said beam-forming network 101 is selected from a group consisting of: (i) a rotman-lens, (ii) a butler-matrix, (iii) a blass-matrix, and (iv) a fixed or passive beam-forming network.

Figure 12A:
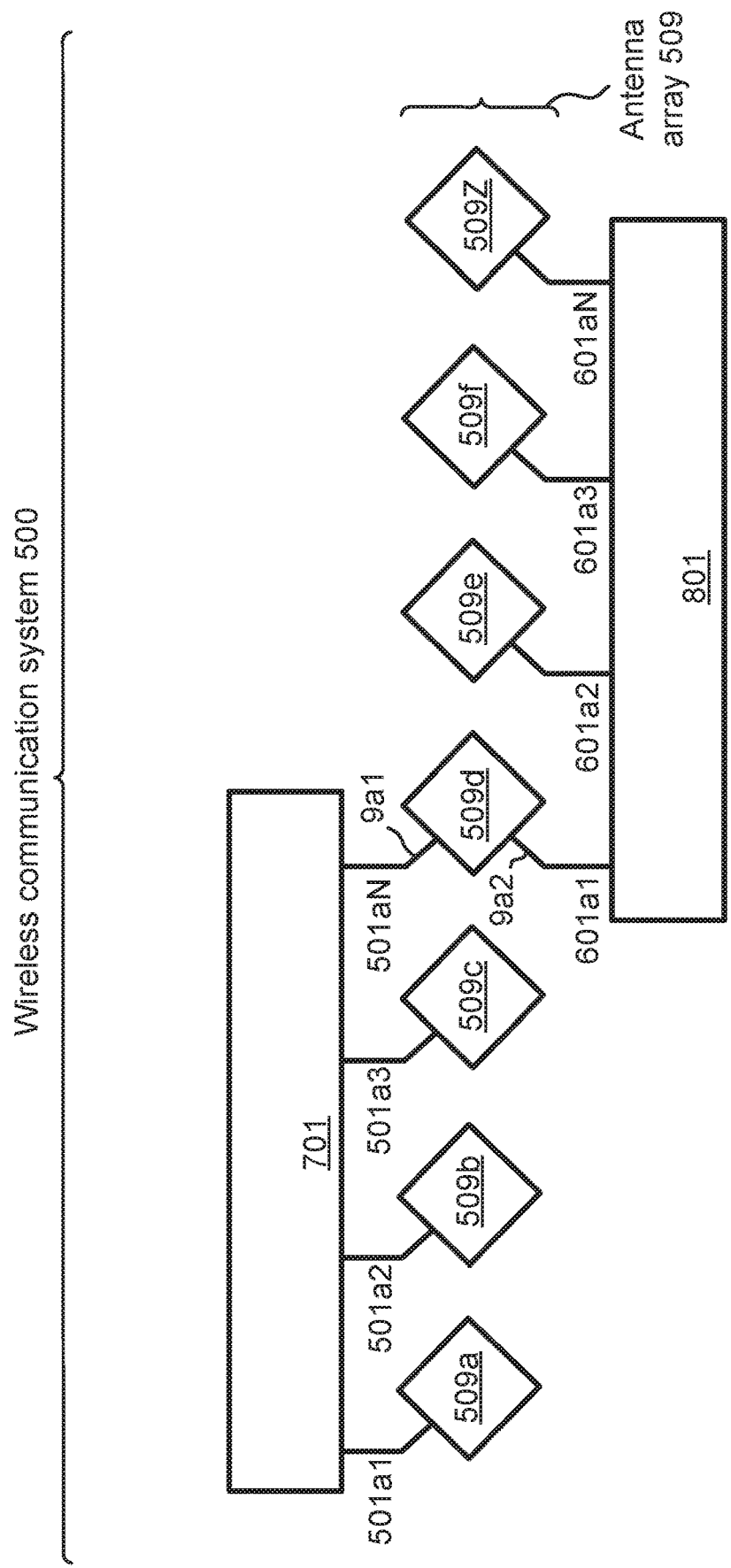
FIG. 12A illustrates one embodiment of a wireless communication system capable of generating a plurality of beams via an antenna array using combined capabilities of at least two beam-forming networks.

FIG. 12A illustrates one embodiment of a wireless communication system 500 capable of generating a plurality of beams via an antenna array 509 using combined capabilities of at least two beam-forming networks. Wireless communication system 500 includes: (i) an antenna array 509 having at least two antennas 509a, 509b, 509c, 509d, 509e, 509f, and 509Z, out of which at least one antenna is a cross-polarized antenna 509d having a first-polarity 9a1 and a second-polarity 9a2 inputs; 7 antennas are illustrated as a non-limited example, and (ii) at least a first 701 and a second 801 beam-forming networks, each having at least two array ports: array ports 501a1, 501a2, 501a3, 501aN belonging to the first beam-forming network 701, and array ports 601a1, 601a2, 601a3, 601aN belonging to the second beam-forming network 801, each of said at least two array ports connected to one of said at least two antennas: array port 501a1 connected to antenna 509a, array port 501a2 connected to antenna 509b, array port 501a3 connected to antenna 509c, array port 501aN connected to antenna 509d, array port 601a1 connected to antenna 509d, array port 601a2 connected to antenna 509e, array port 601a3 connected to antenna 509f, and array port 601aN connected to antenna 509Z; four array ports per each beam-forming network are illustrated as a non-limiting example. At least one of said array ports 501aN belonging to the first beam-forming network 701 is connected to the at least one cross-polarized antenna 509d via the first-polarity input 9a1, and at least one of said array ports 601a1 belonging to the second beam-forming network 801 is connected to the at least one cross-polarized antenna 509d via the second-polarity input 9a2. One cross-polarized antenna 509d is depicted in a non-limiting fashion, but more than one cross-polarized antenna are possible, thereby allowing more than one antenna to connect with both the first and the second beam-forming networks via first and second polarity inputs respectively.

Figure 12B:
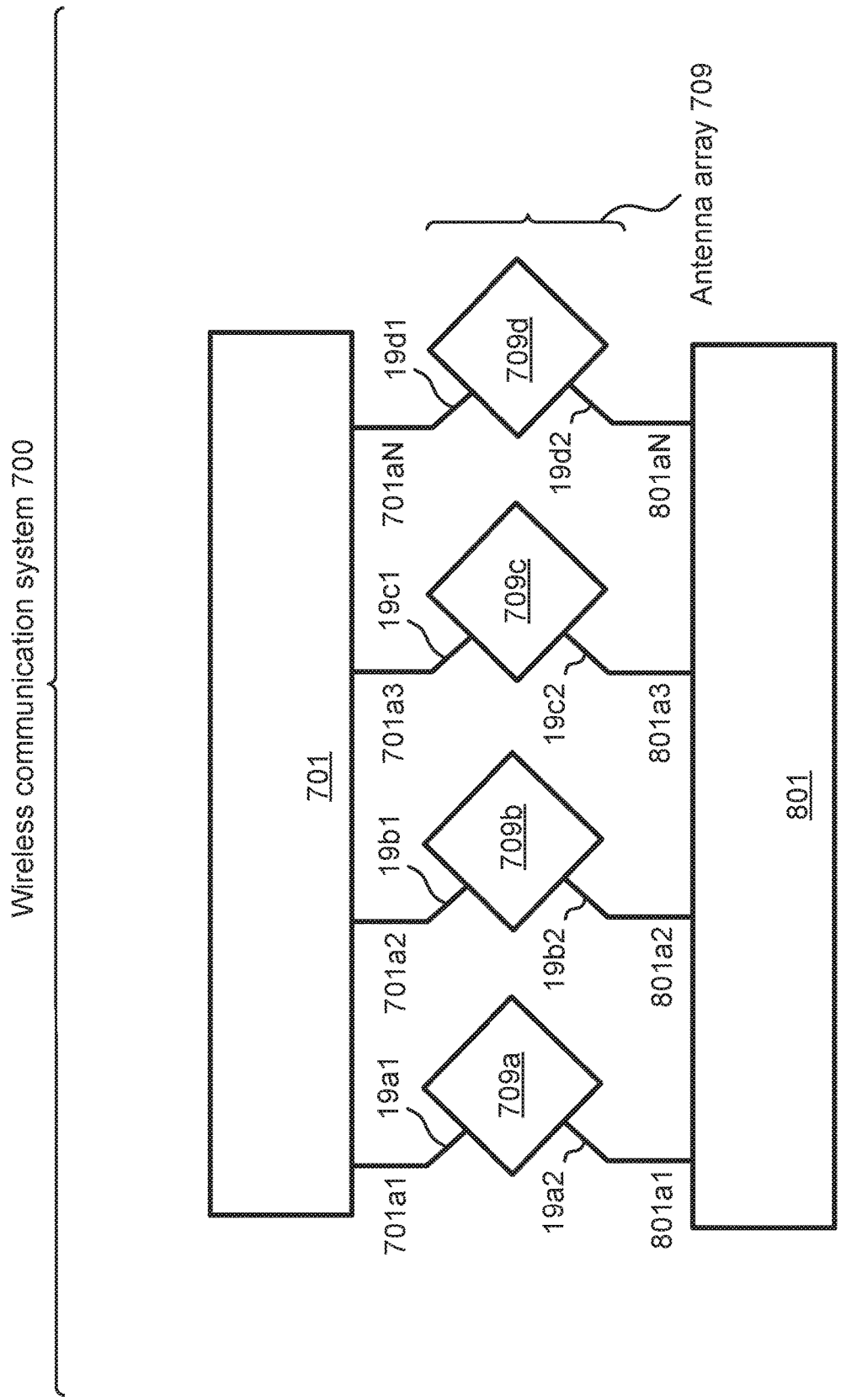
FIG. 12B illustrates one embodiment of a wireless communication system capable of generating a plurality of beams via an antenna array using combined capabilities of at least two beam-forming networks.

FIG. 12B illustrates one embodiment of a wireless communication system 700 capable of generating a plurality of beams via an antenna array 709 using combined capabilities of at least two beam-forming networks. Wireless communication system 700 includes: (i) an antenna array 709 having at least two antennas 709a, 709b, 709c, 509d, wherein each of the antennas are cross-polarized, and each having a first-polarity and a second-polarity inputs: antenna 709a having a first-polarity input 19a1 and a second-polarity input 19a2, antenna 709b having a first-polarity input 19b1 and a second-polarity input 19b2, antenna 709c having a first-polarity input 19c1 and a second-polarity input 19c2, and antenna 709d having a first-polarity input 19d1 and a second-polarity input 19d2; 4 antennas are illustrated as a non-limited example, and (ii) at least a first 701 and a second 801 beam-forming networks, each having at least two array ports: array ports 701a1, 701a2, 701a3, 701aN belonging to the first beam-forming network 701, and array ports 801a1, 801a2, 801a3, 801aN belonging to the second beam-forming network 801. The at least two array ports 701a1, 701a2, 701a3, 701aN belonging to said first beam-forming network 701 are connected to the at least two cross-polarized antennas 709a, 709b, 709c, 709d, respectively, via the first-polarity input 19a1, 19b1, 19c1, 19d1 of each of the at least two cross-polarized antennas, respectively. The at least two array ports 801a1, 801a2, 801a3, 801aN belonging to the second beam-forming network 801 are connected to the at least two cross-polarized antennas 709a, 709b, 709c, 709d, respectively, via the second-polarity input 19a2, 19b2, 19c2, 19d2 of each of the at least two cross-polarized antennas, respectively, such that each of the at least two antennas 709a, 709b, 709c, 709d is connected to both the first 701 and the second 801 beam-forming networks.

Figure 12C:
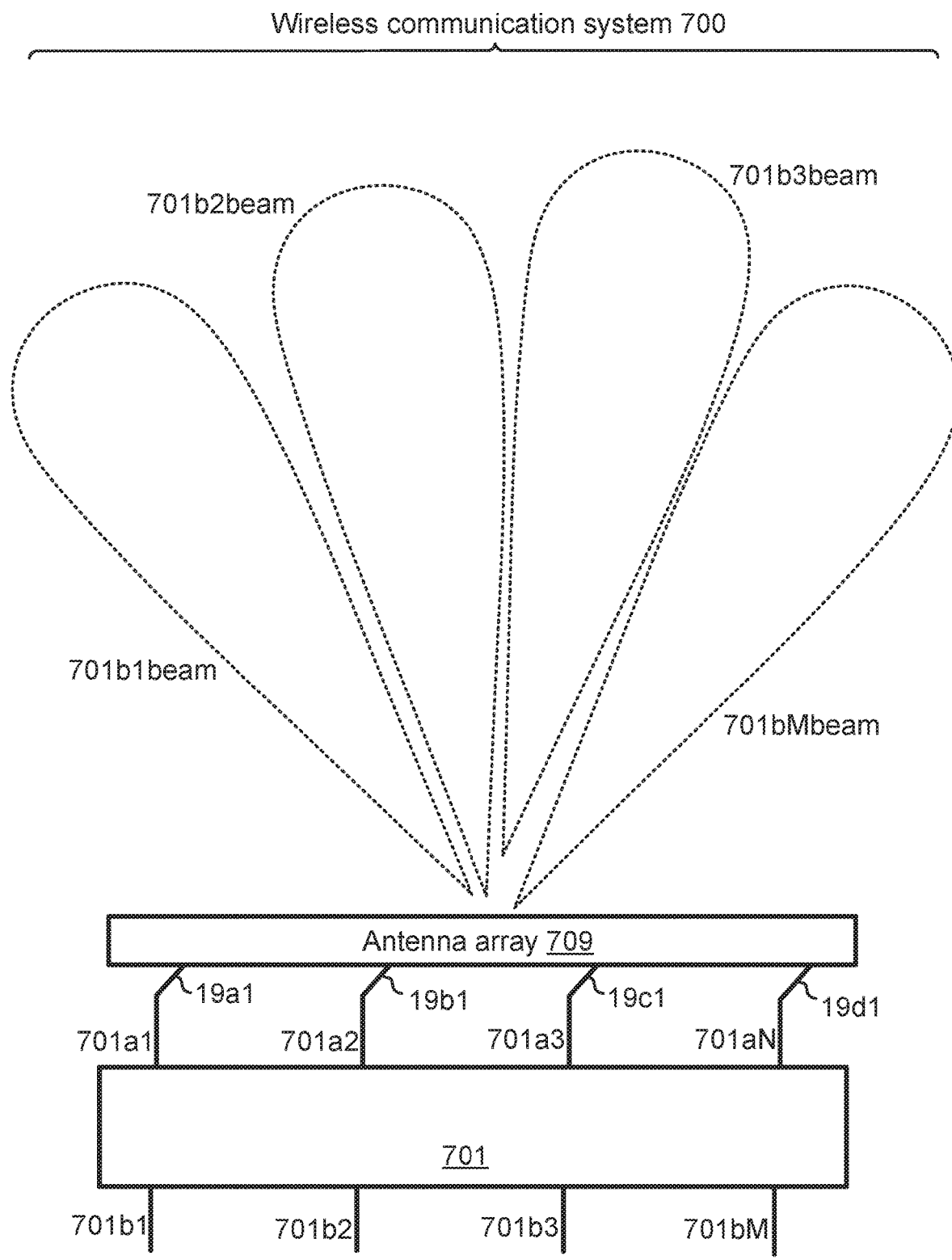
FIG. 12C and FIG. 12D illustrate one embodiment of a plurality of beams generated by injecting radio-frequency signals to beam ports of a plurality of beam-forming networks.
Figure 12D:
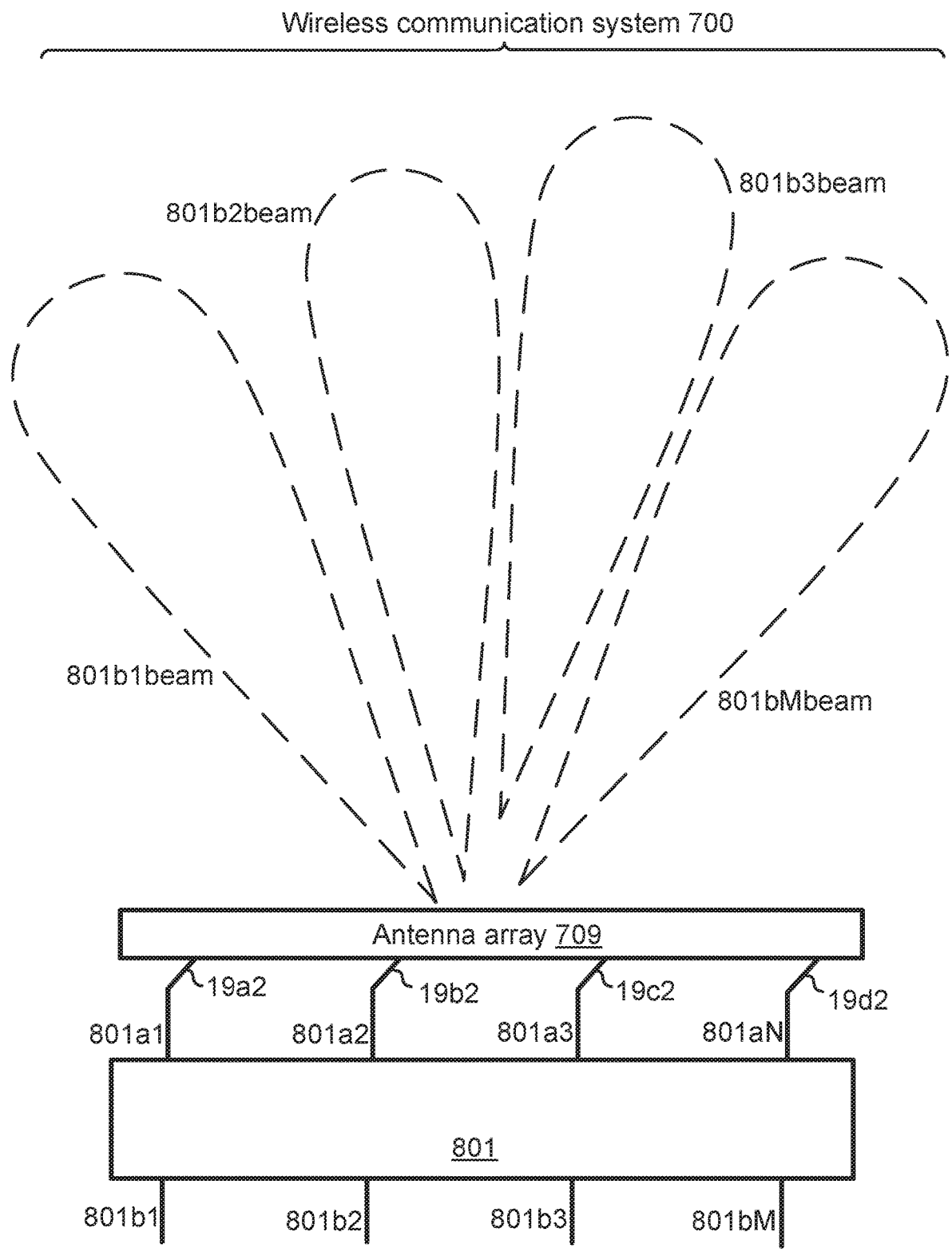

FIG. 12C and FIG. 12D illustrate one embodiment of a plurality of beams generated by injecting radio-frequency signals to beam ports of a plurality of beam-forming networks. wireless communication system 700 further includes: (i) at least a first 701b1 and a second 701bM beam-ports belonging to the first beam-forming network 701; four beam ports 701b1, 701b2, 701b3, 701bM are illustrated as a non-limiting example, and (ii) at least a first 801b1 and a second 801bM beam-ports belonging to the second beam-forming network 801; four beam ports 801b1, 801b2, 801b3, 801bM are illustrated as a non-limiting example. Wireless communication system 700: (i) generates a first 701b1beam and a second 701bMbeam first-polarity-beams having a first and a second directions, respectively, by injection a first and a second radio-frequency signals, respectively, into the first 701b1 and the second 701bM beam-ports belonging to the first beam-forming network 701, respectively, and (ii) generates a first 801b1beam and a second 801bMbeam second-polarity-beams having a first and a second directions, respectively, by injection a first and a second radio-frequency signals, respectively, into the first 801b1 and the second 801bM beam-ports belonging to the second beam-forming network 801, respectively. It is noted that a single antenna array 709 may be used to generate all of the different beams 701b1beam, 701bMbeam, 801b1beam, 801bMbeam, despite the fact that two different beam-forming networks 701, 801 are in use, each responsible to only some of the beams.

In one embodiment, at least one of the first 701 and second 801 beam-forming networks is a rotman-lens. In one embodiment, at least one of the first 701 and second 801 beam-forming networks is a butler-matrix. In one embodiment, at least one of the first 701 and second 801 beam-forming networks is a blass-matrix. In one embodiment, at least one of the first 701 and second 801 beam-forming networks is a passive beam-forming network.

Figure 12E:
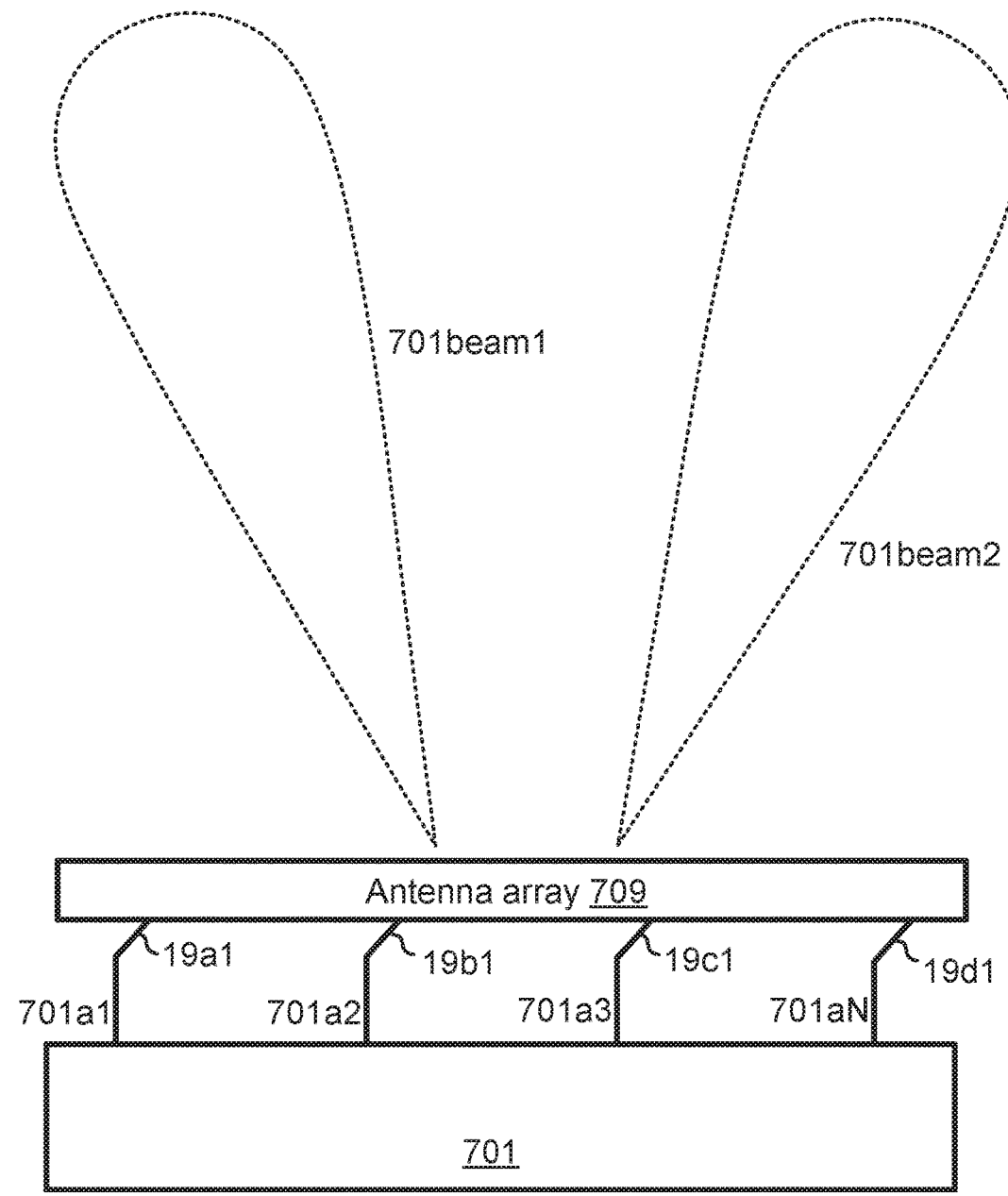
FIG. 12E and FIG. 12F illustrate one embodiment of a plurality of beams generated by a plurality of beam-forming networks.
Figure 12F:
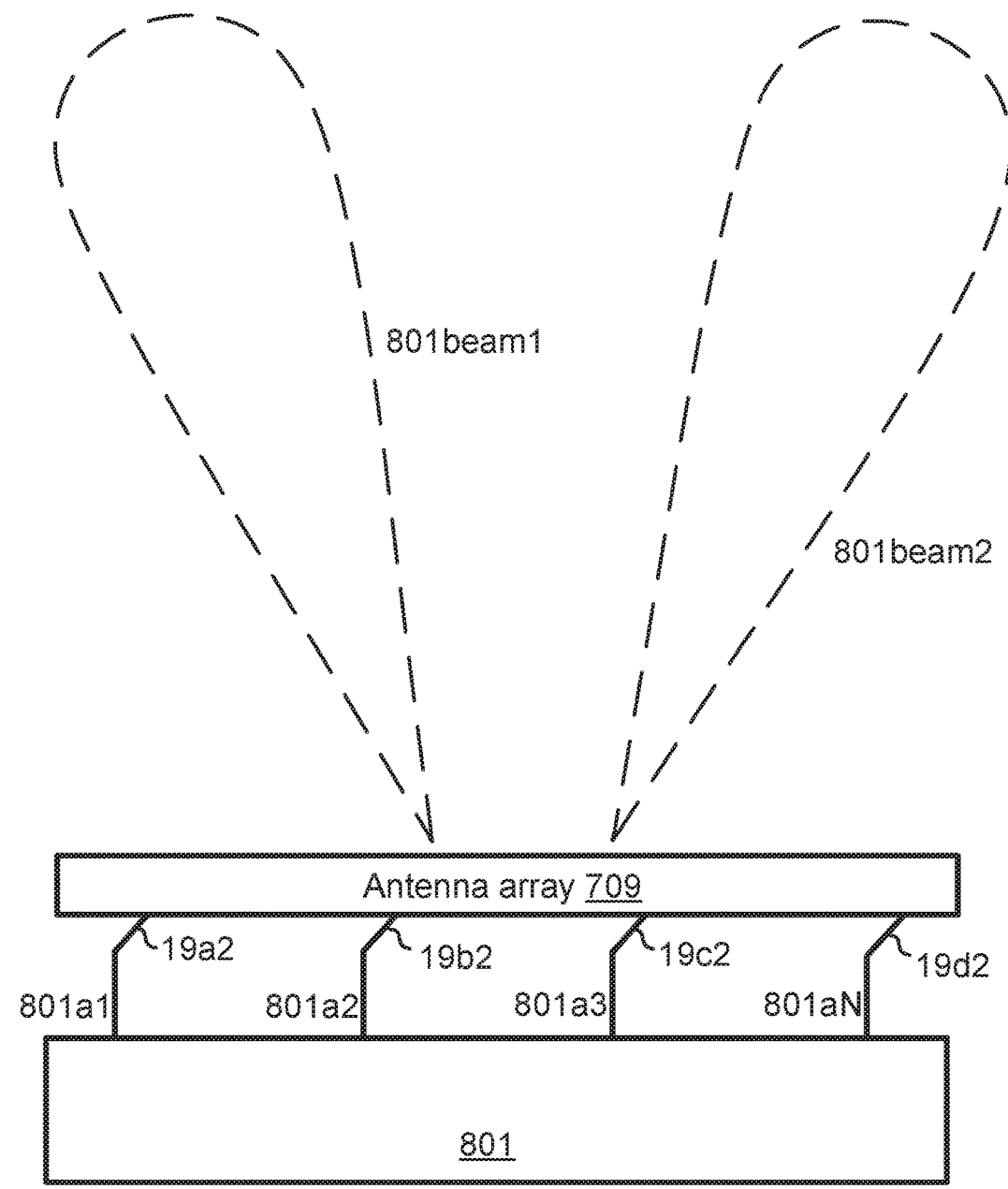
Figure 12G:
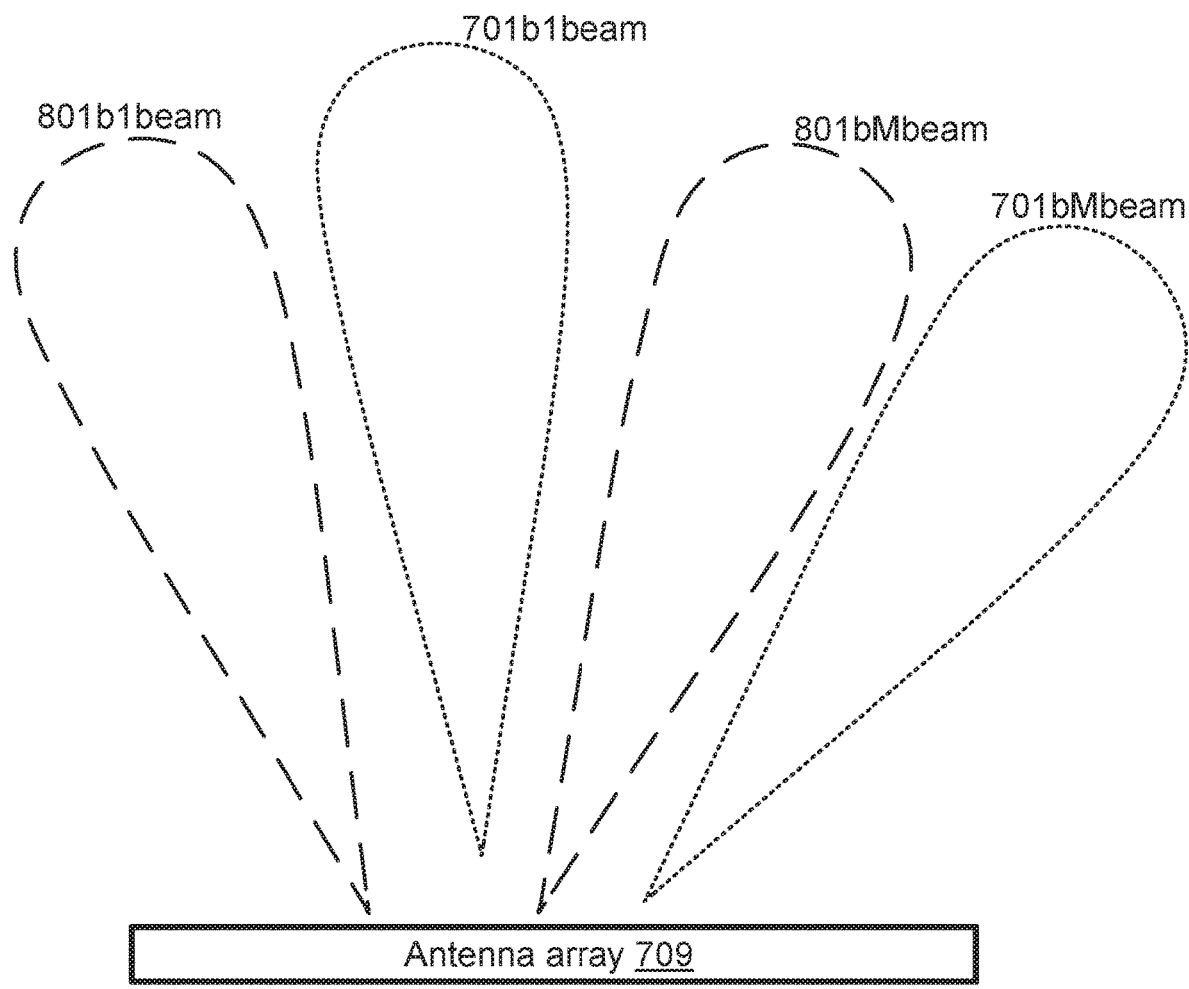
FIG. 12G illustrates one embodiment beam directions.

FIG. 12G illustrates one embodiment beam directions. The first and second directions of the first 701b1beam and second 701bMbeam first-polarity-beams are different than the first and second directions of the first 801b1beam and a second 801bMbeam second-polarity-beams. It is noted that all directions of all beams may be different and unique. It is noted that the first polarity beams 701b1beam, 701bMbeam may be interleaved with the second polarity beams 801b1beam, 801bMbeam, thereby creating a dense beam coverage of a certain sector.

In one embodiment, the first 701 and second 801 beam-forming networks are a first and a second butler-matrixes respectively. In one embodiment, the directions of beams 701b1beam and 701bMbeam associated with the first butler-matrix are made different than the directions of beams 801b1beam and 801bMbeam associated with the second butler-matrix, by intentionally introducing radio-frequency phase shifts between (i) the at least two array ports 701a1, 701a2, 701a3, 701aN belonging to the first butler-matrix and (ii) the at least two antennas 709a, 709b, 709c, 709d, respectively. According to one non-limiting example, the first and second butler-matrices are of the same order. According to one non-limiting example, the first and second butler-matrices are identical. In one embodiment, the radio-frequency phase shifts are progressively linear with array port number: as a non-limiting example, the phase shift between array port 701aN and antenna 709d is made higher by X degrees than the phase shift between array port 701a3 and antenna 709c, which is made higher by additional X degrees than the phase shift between array port 701a2 and antenna 709b, which is made higher by additional X degrees than the phase shift between array port 701a1 and antenna 709a, which may be zero. In one embodiment, the radio-frequency phase shifts are static. According to one non-limiting example, the phase shifts are made by using microstrip delay lines.

In one embodiment, the first and second radio-frequency signals at least partially conform to IEEE-802.11. In one embodiment, the first and second radio-frequency signals at least partially conform to IEEE-802.11n. In one embodiment the first and second radio-frequency signals at least partially conform to IEEE-802.11ac. In one embodiment the first and second radio-frequency signals are within a frequency range of between 2.4 Ghz and 2.5 Ghz, and the first and second beam-forming networks 701, 801 operate directly in said frequency range. In one embodiment the first and second radio-frequency signals are within a frequency range of between 4.8 Ghz and 5.8 Ghz, and the first and second beam-forming networks 701, 801 operate directly in said frequency range.

Figure 13:
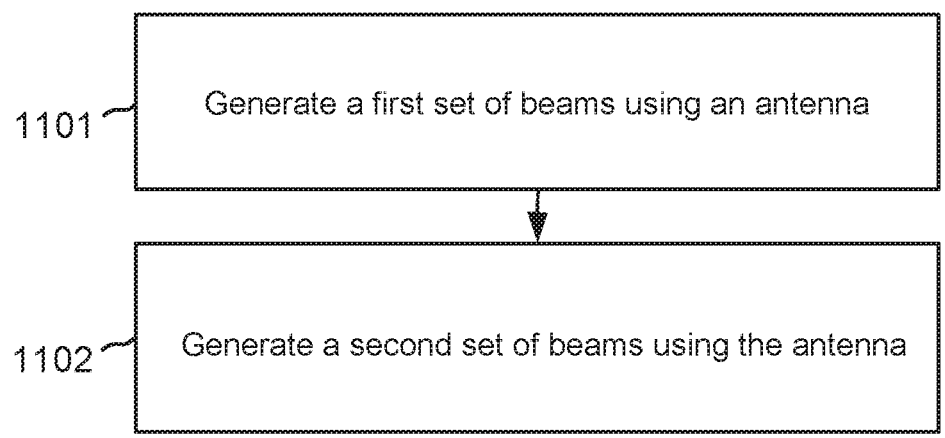
FIG. 13 illustrates one embodiment of a method for increasing beam count by combining two beam-forming networks.

FIG. 12E and FIG. 12F illustrate one embodiment of a plurality of beams generated by a plurality of beam-forming networks. Wireless communication system 700 generates a first 701beam1 FIG. 12E and a second 701beam2 first-polarity-beams having a first and a second directions, respectively, by applying appropriate radio-frequency signals by the first beam-forming network 701 via the first-polarity input 19a1 to 19d1 of each of the at least two cross-polarized antennas of antenna array 709. Wireless communication system 700 further generates a first 801beam1 and a second 801beam2 second-polarity-beams having a first and a second directions, respectively, by applying appropriate radio-frequency signals by the second beam-forming network 801 via the second-polarity input 19a2 to 19d2 of each of said at least two cross-polarized antennas of antenna array 709. In one embodiment at least one of the first 701 and second 801 beam-forming networks is a digital-signal-processing based beam-forming network. In one embodiment at least one of the first 701 and second 801 beam-forming networks is a an active-antenna-switching based beam-forming network. In one embodiment at least one of the first 701 and second 801 beam-forming networks is a maximal-ratio-combining network. FIG. 13 illustrates one embodiment of a method for increasing beam count by combining two beam-forming networks. In step 1101, generating a first set of beams 701b1beam, 701bMbeam having a first beam polarity using a first beam-forming network 701 connected to a cross-polarized phased-array antenna 709 via a set of first-polarity inputs 19a1, 19b1, 19c1, 19d1. In step 1102, generating a second set of beams 801b1beam, 801bMbeam having a second beam polarity using a second beam-forming network 801 connected to the cross-polarized phased-array antenna 709 via a set of second-polarity inputs 19a2, 19b2, 19c2, 19d2. In one embodiment, each one of the first 701 and second 801 beam-forming networks may be: (i) a rotman-lens, (ii) a butler-matrix, (iii) a blass-matrix, or (iv) a fixed or passive beam-forming network.

In one embodiment, the first 701 and second 801 beam-forming networks are a first and a second butler-matrixes respectively. In one embodiment, the cross-polarized phased-array antenna 709 includes N cross-polarized antennas 709a, 709b, 709c, 709d each having a first polarity and a second polarity inputs, such that the set of first-polarity inputs includes N 19a1, 19b1, 19c1, 19d1 inputs and said set of second-polarity inputs comprises N inputs 19a2, 19b2, 19c2, 19d2 as well. The first butler-matrix 701 is of order N, comprising N array ports 701a1, 701a2, 701a3, 701aN connected to said first-polarity inputs 19a1, 19b1, 19c1, 19d1 respectively. The second butler-matrix 801 is of order N, comprising N array ports 801a1, 801a2, 801a3, 801aN connected to said second-polarity inputs 19a2, 19b2, 19c2, 19d2 respectively, and therefore: (i) the first set of beams 701b1beam, 701b2beam, 701b3beam, 701bMbeam comprises N beams directed into N different directions respectively, (ii) the second set of beams 801b1beam, 801b2beam, 801b3beam, 801bMbeam comprises N beams directed into N different directions respectively, thereby generating a total of 2 times N beams 701b1beam, 701b2beam, 701b3beam, 701bMbeam, 801b1beam, 801b2beam, 801b3beam, 801bMbeam, that may be directed into as many as 2 times N directions. It is noted that FIG. 12C and FIG. 12D illustrate a non-limiting example of N=4. In one embodiment, radio-frequency phase shifts are introduced, each progressively linear with array port number, between (i) said N array ports 701a1, 701a2, 701a3, 701aN belonging to the first butler-matrix 701 and (ii) said N cross-polarized antennas 709a, 709b, 709c, 709d, respectively, thereby generating the 2 times N beams into unique 2 times N directions.

Figure 14A:
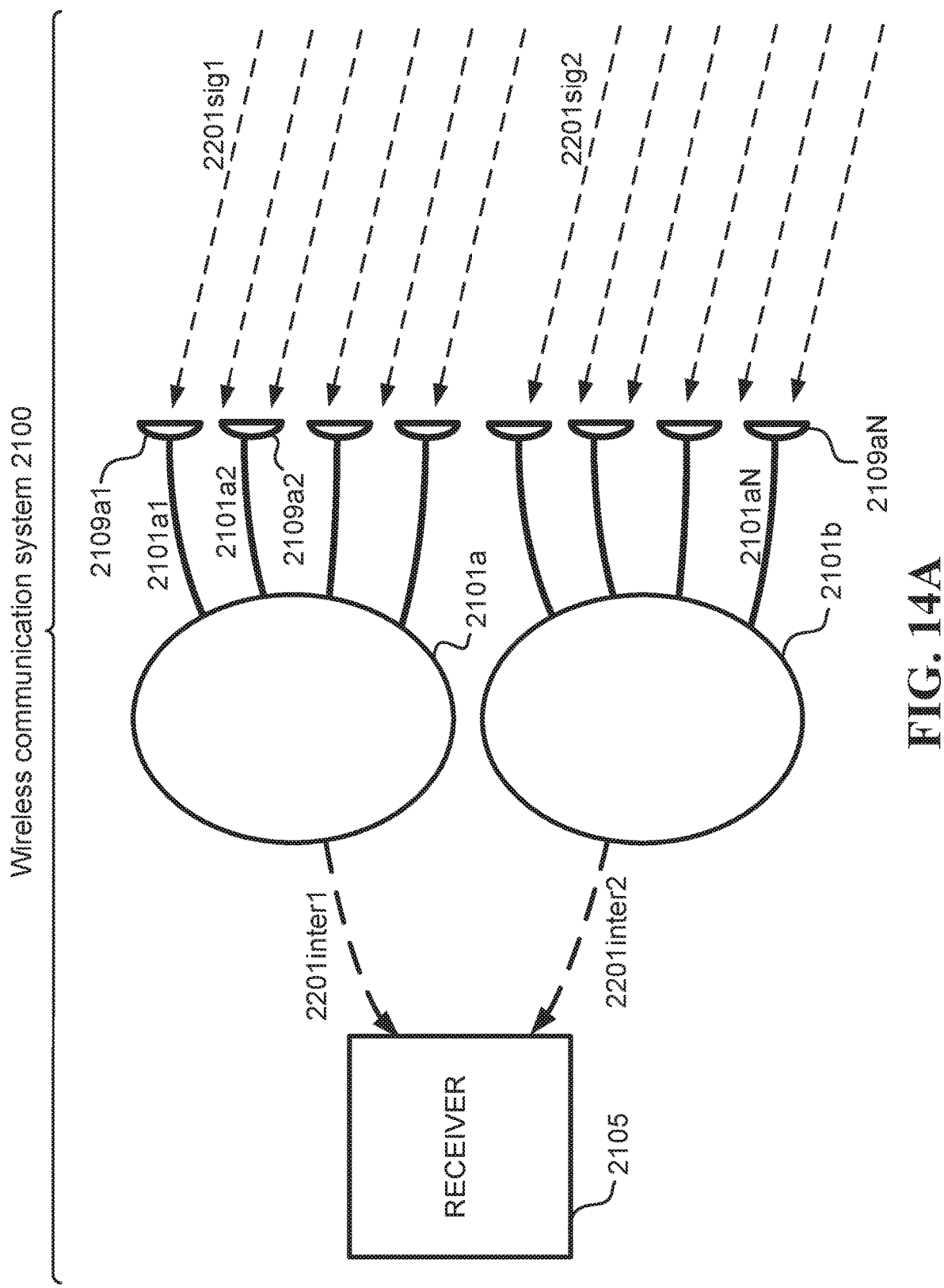
FIG. 14A illustrates one embodiment of a wireless communication system capable of combining signals from several beam-forming networks.
Figure 14B:
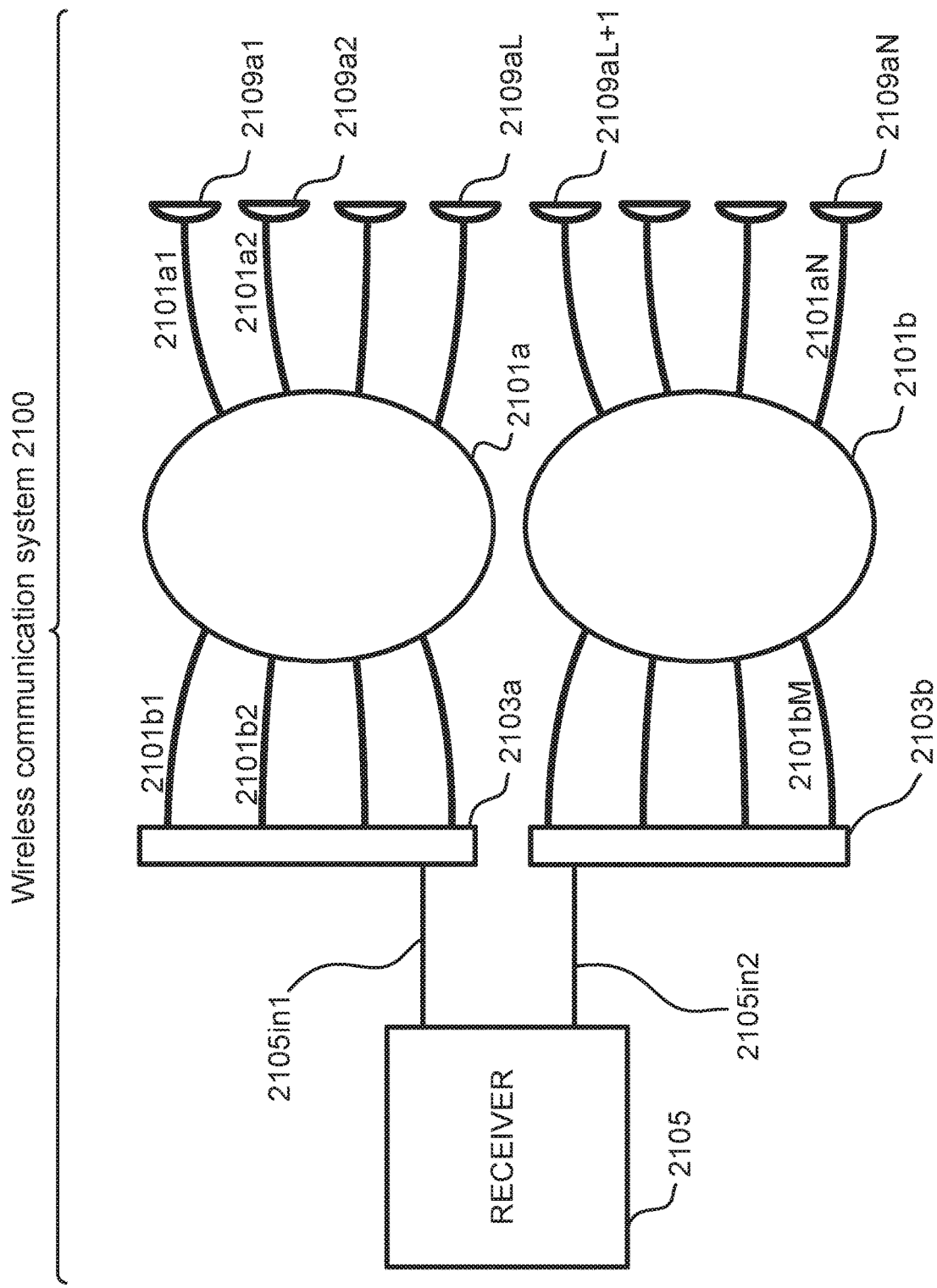
FIG. 14B illustrates one embodiment of a wireless communication system capable of combining signals from several beam-forming networks using radio-frequency switching fabrics.

FIG. 14A and FIG. 14B illustrate some embodiments of a wireless communication system 2100 capable of combining signals from several beam-forming networks. In one embodiment, wireless communication system 2100 includes: (i) a plurality of antennas 2109a1, 2109a2 to 2109aN; 8 antennas are illustrated in a non-limiting fashion, and (ii) at least a first 2101a and a second 2101b beam-forming networks connected via array ports 2101a1, 2101a2 to 2101aN to said plurality of antennas 2109a1, 2109a2 to 2109aN respectively. Two beam forming networks are illustrated in a no-limiting fashion, but three, four, or even more beam-forming networks are possible. The first beam-forming network 2101a is illustrated as having four array ports connected to four corresponding antennas in a non-limiting fashion. The second beam-forming network 2101b is illustrated as having four array ports connected to four corresponding antennas in a non-limiting fashion. The first 2101a and second 2101b beam-forming networks combine coherently, respectively, a first 2201sig1 and a second 2201sig2 wireless signals arriving at the antennas, into a first 2201inter1 and a second 2201inter2 intermediate signals respectively as follows: The first wireless signal 2201sig1: (i) arrives at the antennas connected to the first beam-forming network 2101a, then (ii) reaches the first beam-forming network 2101a through the array ports connecting the first beam-forming network 2101a to the antennas, and then (iii) concentrated into intermediate signal 2201inter1 by the first beam-forming network 2101a. Similarly, the second wireless signal 2201sig2: (i) arrives at the antennas connected to the second beam-forming network 2101b, then (ii) reaches the second beam-forming network 2101b through the array ports connecting the second beam-forming network 2101b to the antennas, and then (iii) concentrated into intermediate signal 2201inter2 by the second beam-forming network 2101b. Wireless communication system 2100 further includes a receiver 2105 connected to the first 2101a and second 2101b beam-forming networks. The receiver 2105 processes the first 2201inter1 and second 2201inter2 intermediate signals into a single data stream. In one embodiment, the antennas 2109a1, 2109a2 to 2109aN are arranged as at least a first 2109a1, 2109a2 to 2109aL and a second 2109aL+1 to 2109aN antenna arrays. The first 2101a and second 2101b beam-forming networks are connected via the plurality of array ports to the first and second antenna arrays respectively. The first 2101a and second 2101b beam-forming networks combine coherently the first and second wireless signals arriving at said first and second antenna arrays respectively, into the first and second intermediate signals respectively.

In one embodiment, the receiver 2105 is connected to the first 2101a and the second 2101b beam-forming networks via a plurality of beam-ports 2101b1, 2101b2 to 2101bM belonging to said first and second beam-forming networks. In one embodiment, wireless communication system 2100 further includes: (i) a first radio-frequency switching fabric 2103a, capable of routing one of the beam-ports belonging to the first beam-forming network 2101a to a first input 2105in1 of the receiver 2105 according to a detection criterion in accordance with some embodiments. The first input 2105in1 admits the first intermediate signal 2201inter1 into the receiver 2105, and a second radio-frequency switching fabric 2103b, capable of routing one of the beam-ports belonging to the second beam-forming network 2101b to a second input 2105in2 of the receiver 2105 according to a detection criterion in accordance with some embodiments. The second input 2105in2 admits the second intermediate signal 2201inter2 into the receiver 2105.

In one embodiment, the processing of the first 2201inter1 and second 2201inter2 intermediate signals includes combining of the first and the second intermediate signals using maximal-ratio-combining techniques, thereby achieving a reception gain which is a combination of gains achieved by (i) said first and second beam-forming networks and (ii) said maximal-ratio-combining techniques. In one embodiment, the first 2201sig1 and the second 2201sig2 wireless signals are a mixture of a first and a second spatially multiplexed wireless signals generated by a remote transceiver from a single data stream, and the processing of the first 2201inter1 and the second 2201inter2 intermediate signals includes decoding the first and the second wireless signals into the single data stream, thereby achieving said decoding together with a reception gain including gains of the first 2101a and the second 2101b beam-forming networks. In one embodiment, the first and second spatially multiplexed wireless signals are used by the IEEE-802.11n standard to boost transmission rates of said single data stream.

In one embodiment, the first 2201sig1 and the second 2201sig2 wireless signals at least partially conform to IEEE-802.11. In one embodiment, the first 2201sig1 and the second 2201sig2 wireless signals at least partially conform to IEEE-802.11n. In one embodiment, the first 2201sig1 and the second 2201sig2 wireless signals at least partially conform to IEEE-802.11ac. In one embodiment, the first 2201sig1 and the second 2201sig2 wireless signals are transported using a frequency range of between 2.4 Ghz and 2.5 Ghz, and the first 2101a and the second 2101b beam-forming networks operate directly in said frequency range. In one embodiment, the first 2201sig1 and the second 2201sig2 wireless signals are transported using a frequency range of between 4.8 Ghz and 5.8 Ghz, and the first 2101a and the second 2101b beam-forming networks operate directly in said frequency range. In one embodiment, at least one of the first 2101a and the second 2101b beam-forming networks is a: (i) a rotman-lens, (ii) a butler-matrix, (iii) a blass-matrix, or (iv) a fixed or passive beam-forming network.

Figure 15:
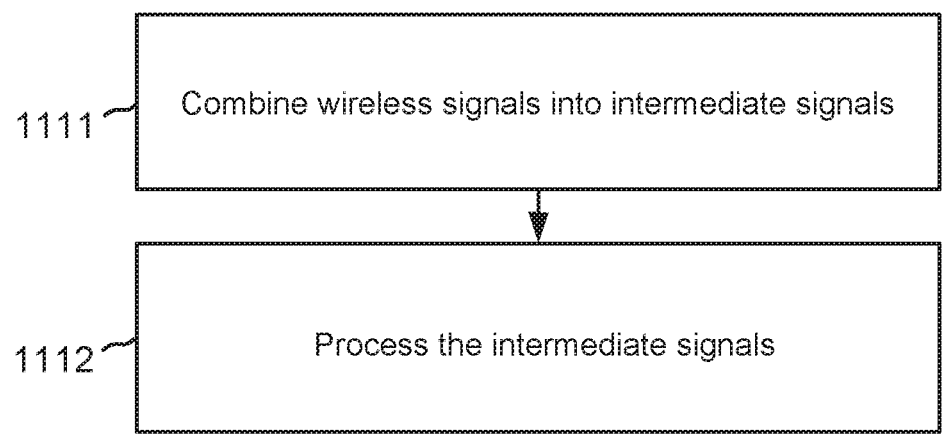
FIG. 15 illustrates one embodiment of a method for combining signals from a plurality of beam-forming networks.

FIG. 15 illustrates one embodiment of a method for combining signals from a plurality of beam-forming networks. In step 1111, combining coherently, by a first and a second beam-forming networks, respectively, a first 2201sig1 and a second 2201sig2 wireless signals arriving at a plurality of antennas connected to said first and second beam-forming networks, into a first 2201inter1 and a second 2201inter2 intermediate signals respectively. In step 1112, processing, by a receiver 2105 connected to the first and second beam-forming networks, said first and second intermediate signals into a single data stream.

Figure 16:
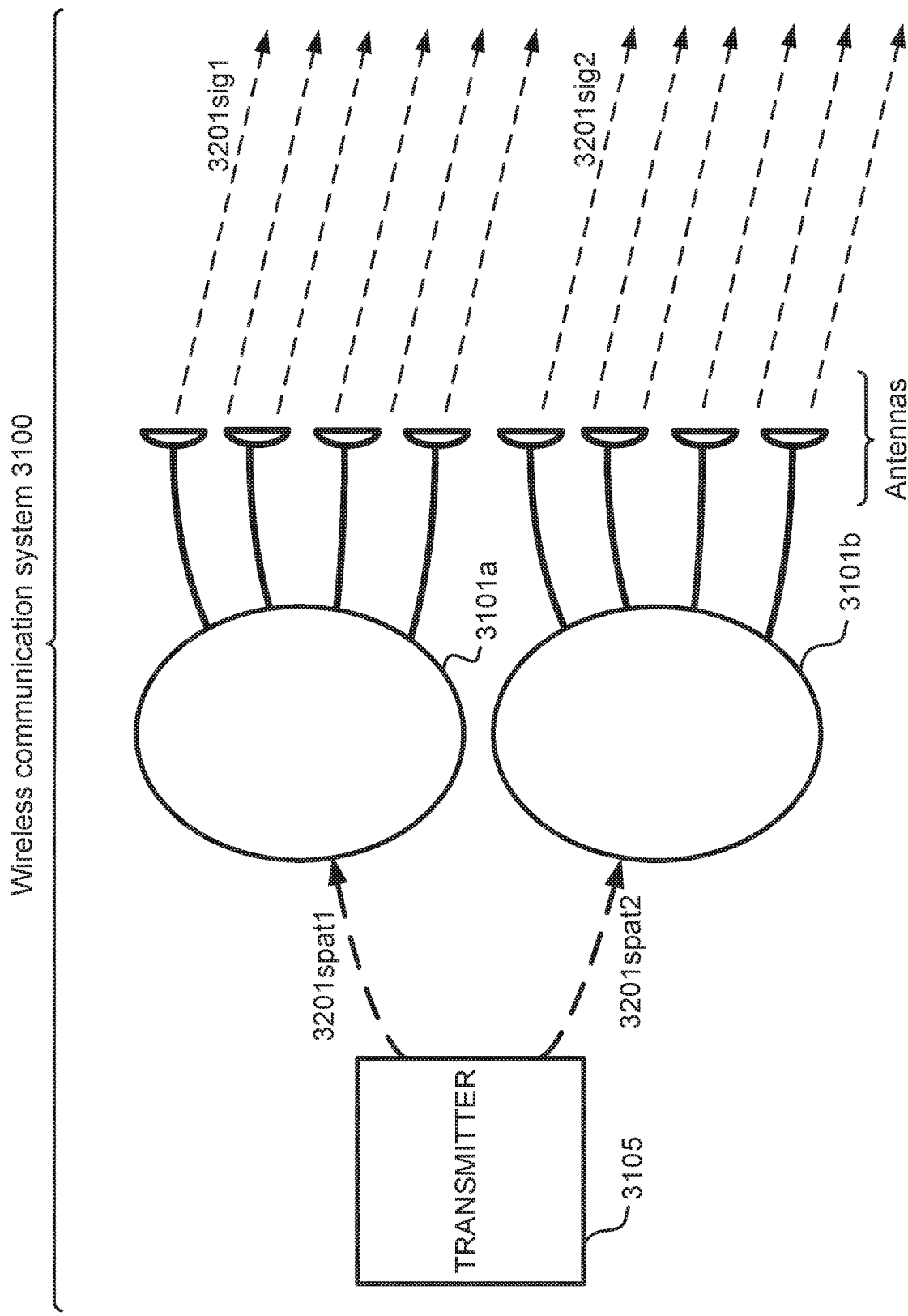
FIG. 16 illustrates one embodiment of a system capable of transmitting spatially multiplexed wireless signals using a plurality of beam-forming networks.

FIG. 16 illustrates one embodiment of a system for transmitting spatially multiplexed wireless signals using a plurality of beam-forming networks. A transmitter 3105 generates a first 3201spat1 and a second 3201spat2 spatially multiplexed signals using a single data stream. Said transmitter 3105 injects said first 3201spat1 and a second 3201spat2 spatially multiplexed signals into beam-ports of a first 3101a and a second 3101b beam-forming networks, respectively. Said first 3101a and second 3101b beam-forming networks transmit a first 3201sig1 and a second 3201sig2 spatially multiplexed wireless signals, respectively, using said first 3201spat1 and a second 3201spat2 spatially multiplexed signals, respectively.

Figure 17:
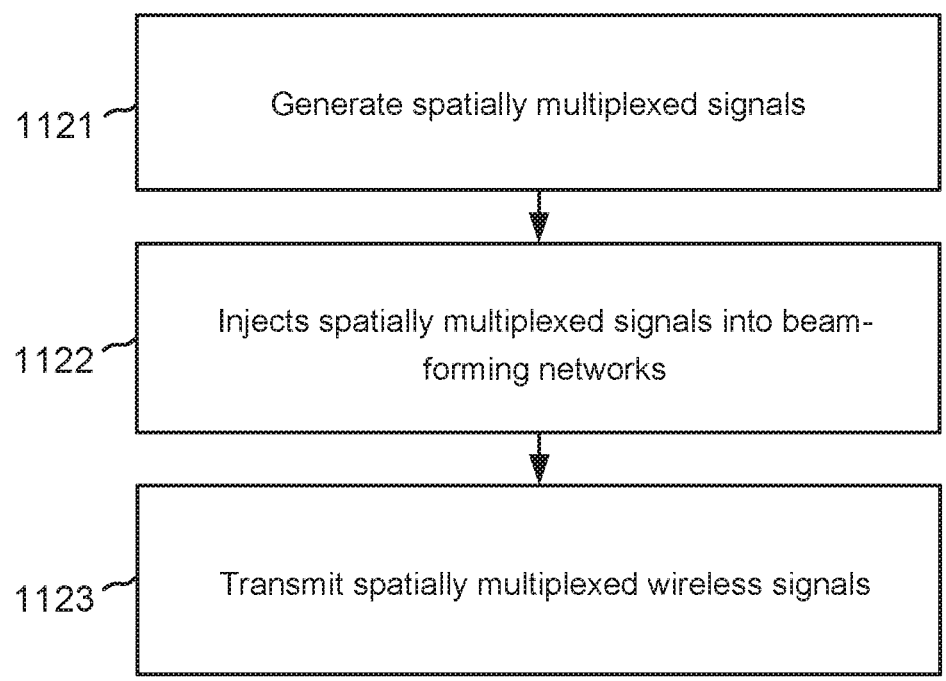
FIG. 17 illustrates one embodiment of a method for transmitting spatially multiplexed wireless signals using a plurality of beam-forming networks.

FIG. 17 illustrates one embodiment of a method for transmitting spatially multiplexed wireless signals using a plurality of beam-forming networks. In step 1121, generating, by a transmitter 3105, a first 3201spat1 and a second 3201spat2 spatially multiplexed signals using a single data stream. In step 1122, injecting, by said transmitter 3105, said first 3201spat1 and a second 3201spat2 spatially multiplexed signals into beam-ports of a first 3101a and a second 3101b beam-forming networks, respectively. In step 1123, transmitting, by said first 3101a and second 3101b beam-forming networks, a first 3201sig1 and a second 3201sig2 spatially multiplexed wireless signals, respectively, using said first 3201spat1 and a second 3201spat2 spatially multiplexed signals, respectively.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/ cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A wireless communication system for generating a plurality of transmission beams via an antenna array using combined capabilities of at least two radio frequency beamforming networks, said system comprising:
   an antenna array comprising two or more antennas, at least one of said two or more antennas being a cross-polarized antenna comprising a first-polarity antenna segment with associated input and a second-polarity antenna segment with associated input;
   a first transmission (Tx) beamforming network comprising two or more array Tx ports, each of said array ports being connected to a different polarity input of at least one of said antennas;
   wherein one of said array Tx ports of said first beamforming network is connected to said at least one cross-polarized antenna via said first-polarity input, and a second array Tx port of said first beamforming network is connected to said at least one cross-polarized antenna via a said second-polarity input such that said first beam forming network generates a first Tx beam in a first direction through said first polarity segment and a second Tx beam in a second direction through said second polarity antenna segment; and
   wherein a second beamforming network is configured to generate one or more Tx beams through said antenna array using either the first or the second polarity inputs.

2. The system of claim 1, wherein:
   all of said two or more antennas are cross-polarized antennas, such that each of said cross-polarized antennas comprising a first-polarity antenna segment with associated input and a second-polarity antenna segment with associated input;
   said array ports of said first beamforming network are connected to said two or more cross-polarized antennas, via said first-polarity input and via said second polarity input of each of said two or more cross-polarized antennas.

3. The system of claim 2, wherein:
   said first beamforming network comprises a first beam port and a second beam-port;
   said second beamforming network comprises a third beam-port and a fourth beam-port; and
   said system is configured to:
   (1) generate first and second Tx first-polarity-beams, the first first-polarity-beam having a first direction and the second first-polarity-beam having a second direction, by applying a first radio-frequency signal into said first beam-port and a second radio-frequency signal into said second beam-port; and
   (2) generate first and second Tx second-polarity-beams, the first second-polarity-beam having a third direction and the second second-polarity-beam having a fourth direction, by applying a third radio-frequency signal into said third beam-port and a fourth radio-frequency signal into said fourth beam-port.

4. The system of claim 3, wherein said first and second beamforming networks are selected from a group consisting of: (i) a rotman-lens, (ii) a butler-matrix, (iii) a blass-matrix, and (iv) a fixed or passive beamforming network.

5. The system of claim 3, wherein the first and second directions are different from said third and fourth directions.

6. The system of claim 5, wherein said first and second beamforming networks are butler-matrixes.

7. The system of claim 6, wherein said first and second directions are made different than said third and fourth directions, by introducing radio-frequency phase shifts between said first and second array ports and said two or more antennas.

8. The system of claim 7, wherein said radio-frequency phase shifts increment linearly with array port number.

9. The system of claim 8, wherein said radio-frequency phase shifts are static.

10. The system of claim 3, wherein the radio-frequency signals conform to IEEE-802.11 related communication standards.

11. The system of claim 3, wherein the radio-frequency signals are within a frequency range of between 2.4 Ghz and 2.5 Ghz, and said first and second beamforming networks are configured to operate directly in the frequency range.

12. The system of claim 3, wherein the radio-frequency signals are within a frequency range of between 4.8 Ghz and 5.8 Ghz, and said first and second beamforming networks are configured to operate directly in the frequency range.

13. The system of claim 2, wherein said system is configured to:
   generate first and second first-polarity-beams, the first first-polarity-beam having a first direction and the second first-polarity-beam having a second direction, by applying appropriate radio-frequency signals by said first beamforming network via said first-polarity input of each of said antennas; and
   generate first and second second-polarity-beams, the first second-polarity-beam having a third direction and the second second-polarity-beam having a fourth direction, by applying appropriate radio-frequency signals by said second beamforming network via said second-polarity input of each of said antennas.

14. The system of claim 13, wherein said first and second beamforming networks are selected from a group consisting of: (i) a digital-signal-processing based beamforming network, (ii) an active-antenna-switching based beamforming network, and (iii) a maximal-ratio-combining network.

15. A method for increasing downlink transmission beam count by combining two beamforming networks, said method comprising:

generating a first set of downlink transmission beams having a first beam polarity using a first beamforming network connected to a cross-polarized phased-array antenna via a set of first-polarity inputs; and generating a second set of beams having a second beam polarity using a second beamforming network connected to the cross-polarized phased-array antenna via a set of second-polarity inputs, thereby doubling the number of downlink transmission beams that could be accommodated using only the first beamforming network or only the second beamforming network.

16. The method of claim 15, wherein the first and second beamforming networks are selected from a group consisting of: (i) a rotman-lens, (ii) a butler-matrix, (iii) a blass-matrix, and (iv) a fixed or passive beamforming network.

17. The method of claim 16, wherein said first and second beamforming networks are butler-matrixes.

18. The method of claim 17, wherein:

said cross-polarized phased-array antenna comprises N cross-polarized antennas each comprising a first polarity and a second polarity inputs, such that said set of first-polarity inputs comprises N inputs and said set of second-polarity inputs comprises N inputs;

said first butler-matrix is of order N, comprising N array ports connected to said first-polarity input respectively;

said second butler-matrix is of order N, comprising N array ports connected to said second-polarity inputs respectively; and therefore:

(i) said first set of downlink transmission beams comprises N downlink transmission beams directed into N different directions respectively, (ii) said second set of downlink transmission beams comprises N downlink transmission beams directed into N different directions respectively, thereby generating a total of 2 times N downlink transmission beams.

19. The method of claim 18, further comprising:

introducing different radio-frequency phase shifts on each array port number between (i) said N array ports belonging to said first butler-matrix and (ii) said N cross-polarized antennas respectively, thereby generating said 2 times N downlink transmission beams into unique 2 times N directions, and thereby doubling the number of uniquely-directed downlink transmission beams that could be accommodated using only the first beamforming network or only the second beamforming network.

* * * * *